United States Patent
Koutsimanis et al.

(10) Patent No.: US 9,420,476 B2
(45) Date of Patent: Aug. 16, 2016

(54) SYSTEMS AND METHODS OF TRIGGERING INTERFERENCE MITIGATION WITHOUT RESOURCE PARTITIONING

(71) Applicant: Telefonaktiebolaget L M Ericsson (publ), Stockholm (SE)

(72) Inventors: Chrysostomos Koutsimanis, Solna (SE); Muhammad Kazmi, Bromma (SE); Lars Lindbom, Karlstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 250 days.

(21) Appl. No.: 14/178,696

(22) Filed: Feb. 12, 2014

(65) Prior Publication Data

US 2014/0233457 A1    Aug. 21, 2014

Related U.S. Application Data

(60) Provisional application No. 61/766,996, filed on Feb. 20, 2013.

(51) Int. Cl.
| | |
|---|---|
| H04W 24/02 | (2009.01) |
| H04J 11/00 | (2006.01) |
| H04L 5/00 | (2006.01) |
| H04B 1/7107 | (2011.01) |

(Continued)

(52) U.S. Cl.
CPC ............. *H04W 24/02* (2013.01); *H04J 11/005* (2013.01); *H04L 5/0073* (2013.01)

(58) Field of Classification Search
CPC ..... H04J 11/005; H04L 5/0073; H04W 24/02
See application file for complete search history.

(56) References Cited

U.S. PATENT DOCUMENTS

2009/0227263 A1* 9/2009 Agrawal ............... H04W 16/16
455/452.1
2010/0322227 A1  12/2010 Luo (Continued)

FOREIGN PATENT DOCUMENTS

| EP | 1453211 A2 | 9/2004 |
|---|---|---|
| WO | 2005114248 A1 | 12/2005 |
| WO | 2011001399 A2 | 1/2011 |

OTHER PUBLICATIONS

International Search Report for International Patent Application No. PCT/IB2014/059093, mailed Jul. 25, 2014, 4 pages.

(Continued)

*Primary Examiner* — Un C Cho
*Assistant Examiner* — Peian Lou
(74) *Attorney, Agent, or Firm* — Withrow & Terranova, PLLC

(57) ABSTRACT

Systems and methods for triggering interference mitigation at a wireless device in a cellular communications network are disclosed. In one embodiment, a node associated with a cellular communications network makes a determination to trigger interference mitigation at a wireless device based on a signal load in at least one interfering cell from which transmissions result in interference at the wireless device during reception from a desired cell, a relation between reference signals used in the desired cell and the at least one interfering cell, and a timing relation between at least one of a group consisting of: signals transmitted by the desired cell and the at least one interfering cell and signals received at the wireless device from the desired cell and the at least one interfering cell. In response to making the determination, the node triggers interference mitigation at the wireless device.

36 Claims, 15 Drawing Sheets

(51) Int. Cl.
*H04W 36/02* (2009.01)
*H04W 24/10* (2009.01)
*H04W 28/02* (2009.01)
*H04W 28/04* (2009.01)
*H04W 72/08* (2009.01)

(56) References Cited

U.S. PATENT DOCUMENTS

2012/0122440 A1 5/2012 Krishnamurthy et al.
2014/0024388 A1* 1/2014 Earnshaw ............. H04L 5/0073
455/452.2

OTHER PUBLICATIONS

Author Unknown, "3rd Generation Partnership Project; Technical Specification Group Radio Access Network; Evolved Universal Terrestrial Radio Access (E-UTRA); Requirements for support of radio resource management (Release 11)," Technical Specification 36.133, Version 11.2.0, Sep. 2012, 3GPP Organizational Partners, 672 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.2.0, Dec. 2012, 3GPP Organizational Partners, 340 pages.

* cited by examiner

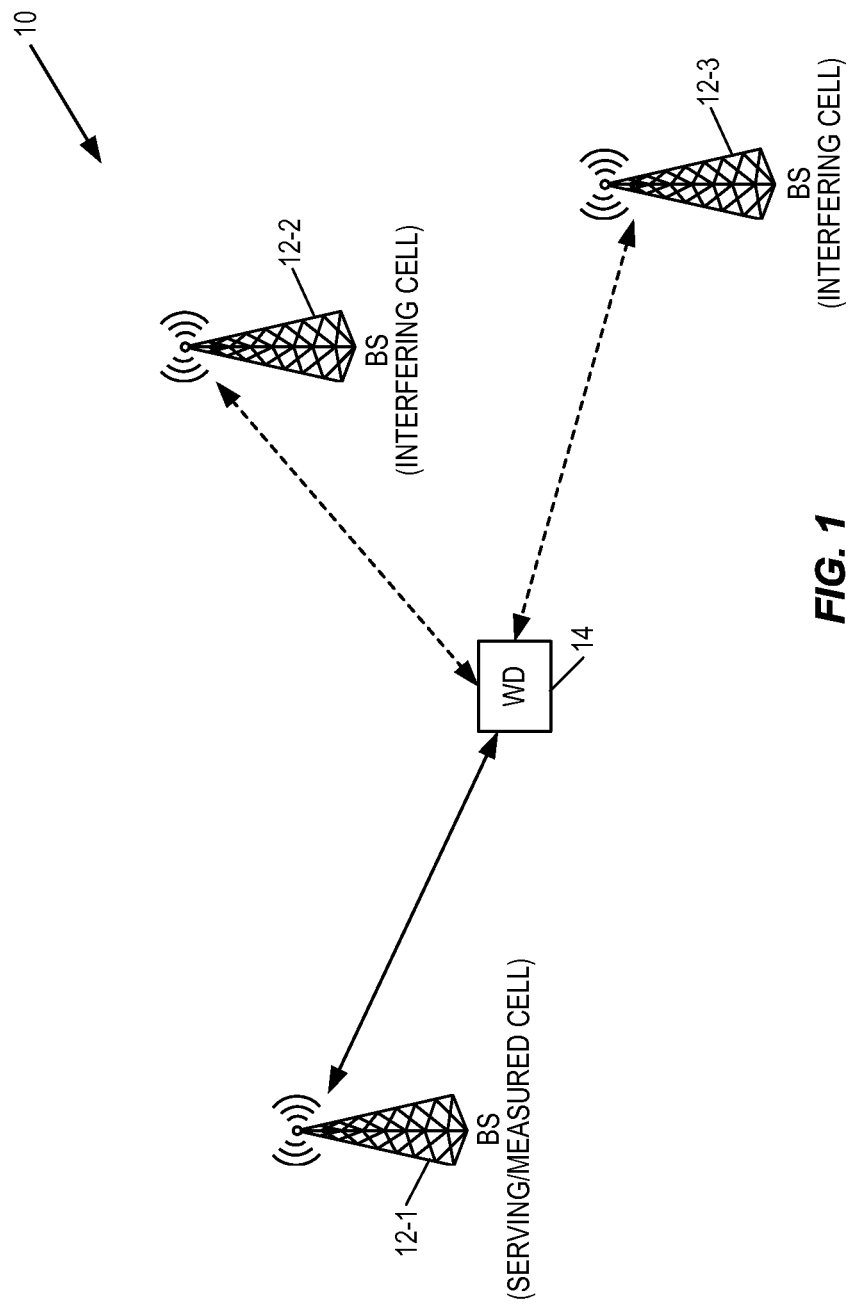

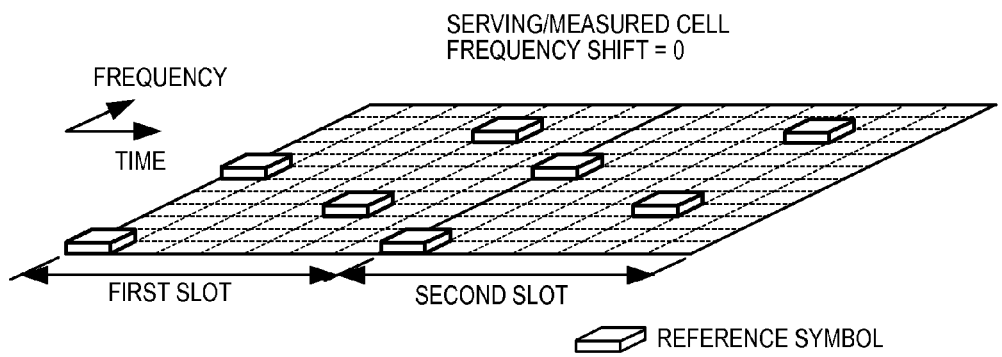
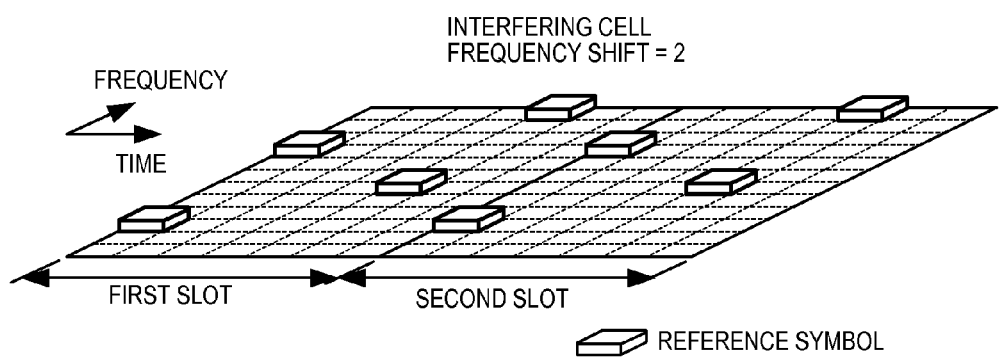
FIG. 2B

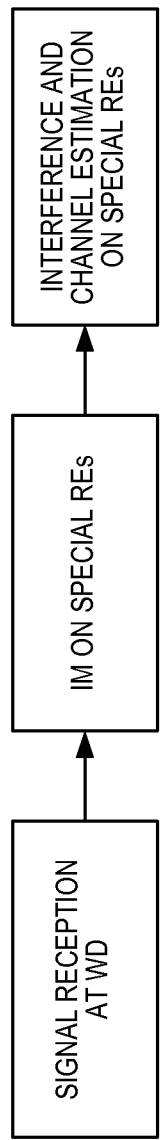

SYSTEMS AND METHODS OF TRIGGERING INTERFERENCE MITIGATION WITHOUT RESOURCE PARTITIONING

RELATED APPLICATIONS

This application claims the benefit of provisional patent application Ser. No. 61/766,996, filed Feb. 20, 2013, the disclosure of which is hereby incorporated herein by reference in its entirety.

FIELD OF THE DISCLOSURE

The present disclosure relates to interference mitigation at a wireless device in a cellular communications network and, more specifically, triggering interference mitigation at a wireless device in a cellular communications network.

BACKGROUND

In cellular communications networks such as $3^{rd}$ Generation Partnership Project (3GPP) Long Term Evolution (LTE) networks, there are two types of deployments, namely, a homogenous network and a heterogeneous network. A homogeneous network utilizes a single layer, or tier, of radio network nodes. In one particular example, all radio network nodes in a homogeneous network are High Power Nodes (HPNs) such as wide area base stations serving macro cells. As another example, all radio network nodes in a homogeneous network are Low Power Nodes (LPNs), e.g., local area base stations serving pico cells. When there are similar load levels in the different cells of a homogeneous network, a wireless device, which is sometimes referred to as a User Equipment device (UE) or terminal, typically receives equally strong signals from a serving or measured cell and from a closest neighboring cell(s), especially when the UE is located in the in the cell border region. Therefore, in a homogeneous network, resource partitioning between serving and neighboring cells for the purpose of inter-cell interference mitigation is not as critical as in heterogeneous networks.

A heterogeneous network includes two or more layers of radio network nodes. In particular, each layer of the heterogeneous network is served by one type, or class, of Base Stations (BSs). In other words, a heterogeneous network includes a set of HPNs (e.g., a set of high power or macro BSs) and a set of LPNs (e.g., a set of low power or medium range, local area, or home BSs) in the same geographical region. A BS power class is defined in terms of maximum output power and other radio requirements (e.g., frequency error, etc.) which depend upon the maximum output power. The maximum output power, Pmax, of the BS is the mean power level per carrier measured at the antenna connector in a specified reference condition. The rated output power, PRAT, of the BSs for different BS power classes is expressed in Table 1 below.

TABLE 1

Base Station rated output power in LTE (FDD and TDD)

| BS class | PRAT |
| --- | --- |
| Wide Area BS | — (note) |
| Medium Range BS | <+38 dBm |
| Local Area BS | ≤+24 dBm |
| Home BS | ≤+20 dBm (for one transmit antenna port) |
| | ≤+17 dBm (for two transmit antenna ports) |
| | ≤+14 dBm (for four transmit antenna ports) |
| | <+11 dBm (for eight transmit antenna ports) |

NOTE:
There is no upper limit for the rated output power of the Wide Area Base Station.

As stated above some of the requirements may also differ between BS classes. For example, as shown in Table 2 below, the frequency error is worse for LPNs. The frequency error is the measure of the difference between the actual BS transmitted frequency and the assigned frequency.

TABLE 2

Frequency error minimum requirement in LTE (FDD and TDD)

| BS class | Accuracy |
| --- | --- |
| Wide Area BS | ±0.05 ppm |
| Medium Range BS | ±0.1 ppm |
| Local Area BS | ±0.1 ppm |
| Home BS | ±0.25 ppm |

A wide area BS serves a macro cell, a medium range BS serves a micro cell, a local area BS serves a pico cell, and a home BS serves a femto cell. Typically, a wide area BS is regarded as a HPN, whereas all the remaining classes of BSs can be regarded as LPNs.

In a two layer macro-pico heterogeneous network, the macro cell and pico cell layers typically include wide area BSs, which are also known as macro BSs, and local area BSs, which are also known as pico BSs, respectively. The high data rate wireless devices located close to the pico BSs (i.e., in the pico layer) can be offloaded from the macro layer to the pico layer. A more complex heterogeneous deployment may include three layers, namely, a macro layer, a micro layer that is served by medium range BSs, and a pico layer. An even more complex heterogeneous deployment may include three layers, namely, a macro layer, a pico layer, and a home or femto layer.

Heterogeneous networks, and in particular the co-channel scenario utilized by heterogeneous networks, bring more challenges in terms of managing interference. For example, inter-cell interference experienced by the UE in the downlink and by the BS in the uplink needs to be mitigated. To address this issue, Inter-Cell Interference Coordination (ICIC), Enhanced ICIC (eICIC) and Further eICIC (FeICIC) techniques have been developed in 3GPP. The eICIC and FeICIC techniques are time domain schemes in that they enable interference mitigation by virtue of resource partitioning in the time domain between the aggressor, or interfering, cell and the victim cell. This in turns partly or fully mitigates the interference towards the victim cell, or more specifically at the receiver of a victim wireless device in the victim cell.

According to the time domain eICIC or FeICIC schemes, subframe utilization across different cells is coordinated in time through backhaul signaling, which for LTE is backhaul signaling over X2 connections between BSs. Subframe utilization is expressed in terms of a time domain pattern of low interference subframes or "a low interference transmit pattern." More specifically, these low interference transmit patterns are referred to as Almost Blank Subframe (ABS) patterns. The ABSs are configured in an aggressor cell (e.g., a macro cell) and are used to protect resources in subframes in the victim cell (e.g., a pico cell) receiving strong inter-cell interference. The serving BS signals one or more measurement patterns to inform the UE about the resources or subframes that the UE should use for performing measurements on a target victim cell (e.g., a serving pico cell and/or neighboring pico cells). These measurement patterns are more specifically referred to as time domain measurement resource restriction for the Primary Cell (PCell) and time domain measurement resource restriction for the neighbor cells. Each measurement pattern includes of bit map of subframes (e.g., 10000000) where 1 indicates a subframe that is available for measurements and 0 indicates a subframe that is not available for measurements. Typically, there are 1-2 restricted subframes per radio frame since traffic density in an LPN is much lower compared to that in a HPN. Examples of measurements are Reference Signal Received Power (RSRP), Reference Signal Received Quality (RSRQ), Channel State Information (CSI) (e.g., Channel Quality Indication (CQI), Rank Indicator (RI), Precoding Matrix Indicator (PMI), etc.). While there can be measurement restriction patterns, there are not such patterns for restricting scheduling of a UE. As such, typically, a UE is also scheduled in restricted subframes which overlap with low interference subframes (e.g., ABS) in aggressor cells. Therefore, UEs experience better signal quality in these subframes.

In cellular networks, a wireless device is normally configured to report a CQI to a serving BS and thereby indicating a Signal-to-Interference plus Noise Ratio (SINR) observed by the wireless device in the downlink from the serving BS. Based on this CQI report, the serving BS selects a suitable Modulation and Coding Scheme (MCS) to be used when transmitting data to the wireless device in the downlink. The wireless device typically derives the CQI by first estimating the downlink channel of the serving BS and then estimating the interference and noise as the residual obtained by removing an estimated desired signal from the received signal. Interference estimation in LTE for CQI estimation is performed over a set of predefined, or configured, Resource Elements (REs). In LTE Release 8 (Rel-8) to Release 10 (Rel-10), interference measurements are expected to be done on REs carrying a Cell-Specific Reference Signal (CRS), whereas in LTE Release 11 (Rel-11) dedicated Interference Measurement Resources (IMRs) were introduced in conjunction with LTE transmission mode 10.

In 3GPP LTE networks, downlink transmissions are based on Orthogonal Frequency Division Multiplexing (OFDM) in which physical resources can be seen as a time-frequency grid of REs, where physical channels and signals are mapped to specific REs. One type of downlink physical signal refers to the CRS, which is used for demodulation of data as well as for mobility measurements and CQI estimation. The CRS is regularly transmitted by all cells, and the structure and locations of the CRS in the time-frequency grid are known after cell acquisition. The density of CRS symbols depends on the number of configured antenna ports. In LTE, a cell can be configured with 1, 2, or 4 antenna ports. The locations of the CRS symbols can be shifted in the frequency domain where the particular shift is given by the physical layer cell identity. In deployments with more than one antenna port, three frequency shifts can be considered. In LTE, a downlink subframe can be configured as "Multicast-Broadcast Single-Frequency Network (MBSFN)" which means that CRS is not present in the data region of the subframe. As CRSs are common to all wireless devices in a cell, CRSs are not precoded and are always transmitted with full power.

For LTE transmission modes 1 to 9, interference measurements as part of deriving CQI are expected to be done on REs carrying CRS of the serving cell. These interference measurements are then used to predict the interference on REs carrying data. The accuracy with which the interference measurements on the REs carrying CRS reflects the interference on the data depends on both the CRS locations and the traffic load of the interfering neighboring cells, i.e. the aggressor cells. In time synchronized LTE networks, CRS transmissions in aggressor cells may either interfere with serving cell REs carrying CRS or REs carrying data, depending on CRS frequency shifts among the cells. Thus, this implies CRS-to-CRS collisions across cells when a non-shifted configuration is used in all cells of a synchronized network. On the other hand, CRS-to-CRS collisions across cells can be partially avoided if shifted CRS configurations are used among cells. However, CRS-to-CRS collisions can in general not be completely avoided with only three frequency shifts, and sometimes non-shifted configurations can be preferred from a user throughput perspective in low-to-medium loaded traffic scenarios.

In a time synchronized network scenario with two dominating aggressor cells, the inter-cell interference on the CRS REs in the cases of non-shifted and shifted CRS configurations can be expressed as:

$$I_{CRS} = \underbrace{I_{CRS}^{NC1} + I_{CRS}^{NC2}}_{LOAD\_INDEPENDENT} \text{ (non-shifted), and}$$

$$I_{CRS} = \underbrace{I_{DATA}^{NC1} + I_{DATA}^{NC2}}_{LOAD\_DEPENDENT} \text{ (shifted),}$$

where $I_{CRS}^{NCx}$ and $I_{DATA}^{NCx}$, for x=1, 2, represent the (averaged) interference caused by Neighbor Cell (NC) CRS and data transmissions, respectively. In the non-shifted scenario, the measured interference refers to only the CRS transmissions of the neighbor cells. Since CRSs are transmitted with full power, a wireless device will measure high interference independently of the traffic load in the neighbor cells in the non-shifted scenario. Thus, such interference measurements can only be representative in scenarios where the aggressor cells are highly loaded. In contrast, in the shifted scenario, the measured interference refers to data transmissions of the neighbor cells, and the interference level observed by a wireless device would then depend on the traffic load in the aggressor cells. As the purpose of the interference measurements is to predict the interference level on data, it can be noticed that the non-shifted case will typically over-estimate the interference level whereas the shifted case will underestimate the interference level as the CRS based interference measurements would not capture the impact of the CRS transmissions of the aggressor cells as illustrated by following expressions:

$$I_{DATA} = I_{DATA}^{NC1} + I_{DATA}^{NC2} \text{(non-shifted), and}$$

$$I_{DATA} = I_{CRS}^{NC1} + I_{CRS}^{NC2} + I_{DATA}^{NC1} + I_{DATA}^{NC2} \text{(shifted).}$$

From the expression $I_{DATA}$ (shifted) it is evident that there will be interference on the data even when there is no scheduled downlink traffic in the aggressor cells, i.e. $I_{DATA}^{NCx}=0$. However, the CRS represents only a fraction of the REs within a resource block (roughly 10%) so the relative impact of the CRS interference on the total interference depends on the traffic load in the aggressor cells. As the traffic load in the aggressor cells increases, the impact of the CRS on the total interference decreases. More specifically, as the traffic load increases, the CRS represents a smaller fraction of the total interference and, as such, the impact of the CRS on the total interference decreases. As in the non-shifted case, the interference measurements will reflect the interference level on data most accurately when the aggressor cells are highly loaded.

In LTE Rel-11 under the FeICIC Work Item, support for Interference Cancellation (IC) by the wireless device on CRS REs (IC-CRS) was introduced. The wireless device has the capability of removing a number of interfering (or aggressor) cells on those REs. The amount of aggressor cells that can be removed is up to two, but in principle it can be any positive number upper bounded by the number of discovered interferers. By applying IC-CRS, channel estimation performance can be further improved due to less noisy signal samples in the non-shifted CRS case. In addition, CRS inter-cell interference on data REs can be further reduced in case of shifted CRS configuration. Furthermore, in order to simplify the IC-CRS implementation on the wireless device side, network assisted Radio Resource Control (RRC) signaling was introduced in LTE Rel-11. With this signaling, the serving cell informs the wireless device of the physical layer cell identities and corresponding number of antenna ports of up to eight potential aggressor cells. When the wireless device has acquired this information, the wireless device knows the locations of the CRS in potential aggressor cells without autonomously detecting these locations.

In an LTE Rel-11 co-channel heterogeneous network deployment, a large Cell Range Expansion (CRE) of up to 9 Decibels (dB) is supported. When a wireless device is in the CRE region of an LPN (e.g., a pico, micro, or femto/home BS), the received signal at the wireless device can be interfered by up to two strong macro aggressor cells. Therefore, in this scenario, the received SINR (aka Synchronization Channel (SCH) Ês/Iot or CRS Ês/Iot) at the wireless device served by the LPN when located in the CRE region of the serving cell can be very low, e.g. down to −11 dB. The SCH herein includes one or more of Primary Synchronization Signal (PSS) and Secondary Synchronization Signal (SSS).

In order to correctly detect received signals, the wireless device in the CRE region has to cancel interference on certain physical signals (e.g., CRS, PSS/SSS) and certain physical channels (e.g., Physical Broadcast Channel (PBCH)). To facilitate interference cancellation or mitigation of these physical signals and/or physical channels at the wireless device, a radio network node can assist the wireless device by providing a list of assistance data as specified in 3GPP Technical Specification (TS) 36.331 for Release 11:

wireless device is used by the wireless device to perform the IC on, e.g., CRS, PSS/SSS, etc. However, in a heterogeneous network deployment, the wireless device typically applies IC on restricted subframes indicated in measurement patterns, which are signaled to the wireless device by the serving radio node via RRC protocol as described above.

RSRP and RSRQ are two existing radio measurements performed by the wireless device. RSRP and RSRQ measurements are used for at least Radio Resource Management (RRM) purposes such as, e.g., mobility, which includes mobility in the RRC connected state as well as mobility in the RRC idle state. RSRP and RSRQ measurements are also used for other purposes such as, e.g., enhanced cell Identity (ID) positioning, Minimization of Drive Test (MDT), etc.

RSRP and RSRQ measurements can be absolute or relative. An absolute measurement is performed on signals from one cell, e.g. a serving cell or a neighboring cell. A relative measurement is the relative difference between the measurement performed on one cell and on another cell, e.g. between a serving cell measurement and a neighboring cell measurement.

CSI measurements performed by the wireless device on the serving cell are used by the network for scheduling, link adaptation, etc. Examples of CSI measurements are CQI, PMI, RI, etc.

The radio measurements performed by the wireless device are used by the wireless device for one or more radio operational tasks. One example of such a task is reporting the measurements to the network, which in turn may use them for various tasks. For example, when in the RRC connected state, the wireless device reports radio measurements to the serving BS of the wireless device. In response to the reported measurements, the serving BS takes certain decisions, e.g. it may send a mobility command to the wireless device for the purpose of a cell change. Examples of cell change are a handover, an RRC connection re-establishment, an RRC connection

```
NeighCellsCRS-Info-r11 ::=      CHOICE {
    release                         NULL,
    setup                           CRS-AssistanceInfoList-r11
}
CRS-AssistanceInfoList-r11 ::=  SEQUENCE (SIZE (1.. maxCellReport)) OF CRS-
AssistanceInfo
CRS-AssistanceInfo ::= SEQUENCE {
    physCellId-r11                  PhysCellId,
    antennaPortsCount-r11           ENUMERATED {an1, an2, an4, spare1},
    mbsfn-SubframeConfigList-r11    MBSFN-SubframeConfigList
}
-- ASN1STOP
```

RadioResourceConfigDedicated field descriptions neighCellsCRSInfo
This field contains assistance information, concerning the primary frequency, used by the UE to mitigate interference from CRS while performing RRM/RLM/CSI measurement or data demodulation. The UE forwards the received CRS assistance information to lower layers.
When the received CRS assistance information is for a cell with CRS colliding with that of the CRS of the cell to measure, the UE may use the CRS assistance information to mitigate CRS interference (as specified in [FFS]) on the subframes indicated by measSubframePatternPCell, measSubframePatternConfigNeigh and csi-MeasSubframeSet1. Furthermore, the UE may use CRS assistance information to mitigate CRS interference from the cells in the IE for the demodulation purpose as specified in [FFS].

According to the above Information Element (IE), the CRS assistance data contains list of aggressor cells, their antenna port information, and their MBSFN configuration.

It has also been specified in 3GPP TS 36.133 V11.2.0 that the wireless device shall meet the measurement requirements when the wireless device is provided with CRS assistance information, which is valid over the measurement period. Therefore, the reception of the CRS assistance data at the release with redirection, a PCell change in Carrier Aggregation (CA), Primary Component Carrier (PCC) change in PCC, etc. In the RRC idle or low activity state, one example of a cell change is a cell reselection. In another example, the wireless device may itself use the radio measurements for performing tasks, e.g. cell selection, cell reselection, etc.

In order to support different functions such as mobility (e.g., cell selection, handover, etc.), positioning a wireless device, link adaption, scheduling, load balancing, admission control, interference management, interference mitigation, etc., a radio network node (e.g., a BS) also performs radio measurements on signals transmitted and/or received by the radio network node. Examples of such measurements are Signal-to-Noise Ratio (SNR), SINR, Received Interference Power (RIP), Block Error Ratio (BLER), propagation delay between a wireless device and itself, transmit carrier power, transmit power of specific signals (e.g., Transmit (Tx) power of reference signals), positioning measurements, etc.

In a multi-carrier or CA system, a wireless device is served by multiple Component Carriers (CCs), which are also sometimes referred to as cells or serving cells. The term CA is also called (e.g., interchangeably called) "multi-carrier system," "multi-cell operation," "multi-carrier operation," or "multi-carrier" transmission and/or reception. CA is used for transmission of signaling and data in the uplink and downlink directions. One of the CCs is a PCC, which may also be referred to simply as a primary carrier or even an anchor carrier. The remaining CC(s) are referred to as a Secondary Component Carrier(s) (SCC(s)) or simply a secondary carrier(s) or even a supplementary carrier(s). Generally, the PCC carries essential wireless device specific signaling. The PCC, which is also known as the PCell, exists in both uplink and downlink directions in CA. In case there is single uplink CC, the PCell is obviously on that CC. The network may assign different PCCs to different wireless devices operating in the same sector or cell.

Therefore, in CA, the wireless device has more than one serving cell in the downlink and/or in the uplink: one serving PCell and one or more serving Secondary Cells (SCells) operating on the PCC and SCC(s), respectively. The PCell is interchangeably referred to as a Primary Serving Cell (PSC). Similarly, the SCell(s) is (are) interchangeably referred to as a Secondary Serving Cell(s) (SSC(s)). Regardless of the terminology, the PCell and SCell(s) enable the wireless device to receive and/or transmit data. More specifically, the PCell and SCell(s) exist in the downlink and uplink for the reception and transmission of data by the wireless device. The remaining non-serving cells on the PCC and SCC are called neighbor cells.

The CCs belonging to the CA scheme may belong to the same frequency band (for intra-band CA), different frequency bands (for inter-band CA), or any combination thereof (e.g., two CCs in band A and one CC in band B). Inter-band CA including carriers distributed over two bands is also referred to as Dual-Band-Dual-Carrier-High Speed Downlink Packet Access (DB-DC-HSDPA) in HSPA or inter-band CA in LTE. Furthermore, the CCs in intra-band CA may be adjacent or non-adjacent in frequency domain. The non-adjacent case is referred to as intra-band non-adjacent CA). A hybrid CA including intra-band adjacent, intra-band non-adjacent, and inter-band is also possible. Using CA between carriers of different technologies is also referred to as "multi-Radio Access Technology (RAT) CA," "multi-RAT-multi-carrier system," or simply "inter-RAT CA." For example, the carriers from Wideband Code Division Multiple Access (WCDMA) and LTE may be aggregated. Another example is the aggregation of LTE and Code Division Multiple Access (CDMA) 2000 carriers. Yet another example is the aggregation of LTE Frequency Division Duplexing (FDD) and LTE Time Division Duplexing (TDD) carriers. For the sake of clarity, CA within the same RAT can be regarded as "intra-RAT" or simply "single RAT" CA.

Multi-carrier operation may also be used in conjunction with multi-antenna transmission. For example, signals on each CC may be transmitted by the BS to the wireless device over two or more antennas. Further, the CCs used for CA may or may not be co-located in the same site or BS or radio network node (e.g., relay, mobile relay, etc.). For instance, the CCs may originate (i.e., be transmitted/received) at different locations (e.g., from non-co-located BSs, or from a BS and a Remote Radio Head (RRH) or Remote Radio Unit (RRU)). Examples of combined CA and multi-point communication include Distributed Antenna System (DAS), RRH, RRU, Coordinated Multi-Point (COMP), multi-point transmission/reception, etc.

Several positioning methods for determining the location of a target device, which can be a wireless device, a mobile relay, a Personal Digital Assistant (PDA), or the like may be used. These methods include:

Satellite based methods: Satellite based methods use Assisted Global Navigation Satellite System (A-GNSS) (e.g., Assisted Global Positioning System (A-GPS)) measurements for determining position of a target device.

Observed Time Difference of Arrival (OTDOA): OTDOA methods use Reference Signal Time Difference (RSTD) measurements for the target device to determine the position of the device in LTE.

Uplink Time Difference of Arrival (UTDOA): UTDOA uses measurements done at a Location Management Unit (LMU) to determine the position of a target device.

Enhanced cell ID: Enhanced cell ID based methods use one or more of UE Receive (Rx)–Tx time difference, BS Rx–Tx time difference, LTE RSRP/RSRQ, High Speed Packet Access (HSPA) Common Pilot Channel (CPICH) measurements, Angle of Arrival (AoA), etc. to determine UE position. Fingerprinting is considered to be one type of enhanced cell ID method.

Hybrid methods: Hybrid methods use measurements from more than one method for determining UE position.

In LTE, the positioning node, which is also known as an Evolved Serving Mobile Location Centre (E-SMLC) or location server, configures the wireless device, BS, or LMU to perform one or more positioning measurements. The positioning measurements are used by the wireless device or the positioning node to determine the location of the wireless device. The positioning node communicates with wireless device and the BS in LTE using LTE Positioning Protocol (LPP) and LPP A (LPPa) protocols, respectively.

SUMMARY

Systems and methods for triggering interference mitigation at a wireless device in a cellular communications network are disclosed. In one embodiment, a node associated with a cellular communications network makes a determination to trigger interference mitigation at a wireless device based on a signal load in at least one interfering cell from which transmissions result in interference at the wireless device during reception from a desired cell, a relation between reference signals used in the desired cell and the at least one interfering cell, and a timing relation between at least one of a group consisting of: signals transmitted by the desired cell and the at least one interfering cell and signals received at the wireless device from the desired cell and the at least one interfering cell. In response to making the determination, the node triggers interference mitigation at the wireless device. By triggering interference mitigation in response to the aforementioned conditions, interference mitigation is substantially improved.

In one embodiment, the desired cell is a serving cell of the wireless device. In another embodiment, the desired cell is a measured cell of the wireless device.

In one embodiment, the node is the wireless device such that making the determination to trigger interference mitigation at the wireless device and triggering the interference mitigation are each performed by the wireless device. Still further, in one embodiment, the wireless device receives an indication from a network node of the cellular communications network that the wireless device is to perform interference mitigation and, in response, makes the determination to trigger interference mitigation at the wireless device.

In one embodiment, the node is a network node of the cellular communications network such that making the determination to trigger interference mitigation at the wireless device and triggering the interference mitigation are each performed by the network node. Further, in one embodiment, the network node is a radio access node. In one particular embodiment, the radio access node is a base station of a serving cell of the wireless device. In one embodiment, the network node triggers interference mitigation at the wireless device by providing an implicit indication to the wireless device to perform interference mitigation. In another embodiment, the network node triggers interference mitigation at the wireless device by providing an explicit indication to the wireless device to perform interference mitigation.

In one embodiment, the node makes the determination to trigger interference mitigation at the wireless device when predefined criteria are satisfied, where the predefined criteria are based on the signal load in the at least one interfering cell, the relation between the reference signals used in the desired cell and the at least one interfering cell, and the timing relation. In one embodiment, the predefined criteria include: a first criterion that the relation between the reference signals used in the desired cell and the at least one interfering cell be non-colliding, wherein the non-colliding reference signals do not overlap in time and frequency, and a second criterion that the signal load in the at least one interfering cell be less than a predetermined threshold. In one embodiment, the interference mitigation is Cell-Specific Reference Signal (CRS) interference mitigation, and the relation between the reference signals is a relation between CRSs used in the desired cell and the at least one interfering cell.

In one embodiment, the relation between the reference signals used in the desired cell and the at least one interfering cell includes a colliding or non-colliding relation between the reference signals used in the desired cell and the at least one interfering cell, wherein the colliding reference signals overlap (fully or partly) in time and/or frequency. Further, in one embodiment, the reference signals are CRSs used in the desired cell and the at least one interfering cell. In one embodiment, the node makes the determination to trigger interference mitigation when predefined criteria are satisfied, wherein the predefined criteria are based on the signal load in the at least one interfering cell, the relation between the reference signals used in the desired cell and the at least one interfering cell, and the timing relation, and the predefined criteria include a first criterion based on the colliding or non-colliding relation between the reference signals used in the desired cell and the at least one interfering cell.

In one embodiment, the node triggers the interference mitigation such that the interference mitigation is performed by the wireless device during channel estimation, and the node makes the determination to trigger interference mitigation when predefined criteria are satisfied, wherein the predefined criteria are based on the signal load in the at least one interfering cell, the relation between the reference signals used in the desired cell and the at least one interfering cell, and the timing relation, and the predefined criteria include a first criterion that the relation between the reference signals used in the desired cell and the at least one interfering cell be non-colliding.

In one embodiment, the node makes the determination to trigger interference mitigation when predefined criteria are satisfied, wherein the predefined criteria are based on the signal load in the at least one interfering cell, the relation between the reference signals used in the desired cell and the at least one interfering cell, and the timing relation, and the predefined criteria include a first criterion that the timing relation be such that the wireless device can perform the interference mitigation using a single receiver.

In one embodiment, the node makes the determination to trigger interference mitigation when predefined criteria are satisfied, wherein the predefined criteria are based on the signal load in the at least one interfering cell, the relation between the reference signals used in the desired cell and the at least one interfering cell, and the timing relation, and the predefined criteria include a first criterion that the timing relation be less than a predetermined threshold.

In one embodiment, the node makes the determination to trigger interference mitigation at the wireless devices further based on one or more supplemental criteria.

In one embodiment, the one or more supplemental criteria include a signal operation type of the wireless device. In one embodiment, the signal operation type is one of a group consisting of: channel estimation, interference estimation, demodulation assessment, and Channel State Information (CSI) assessment.

In one embodiment, the signal operation type of the wireless device is interference estimation followed by channel estimation and the at least one interfering cell includes two or more interfering cells. Further, in this embodiment, the node makes a determination to trigger interference mitigation at the wireless device for at least one of the two or more interfering cells that is inactive prior to interference estimation and to trigger interference mitigation at the wireless device for at least one other of the two or more interfering cells that is active after interference estimation and prior to channel estimation. In response, the node triggers interference mitigation at the wireless device for the at least one of the two or more interfering cells that is inactive prior to interference estimation and interference mitigation at the wireless device for the at least one other of the two or more interfering cells that is active after interference estimation and prior to channel estimation in response to making the determination.

In one embodiment, the one or more supplemental criteria include a battery life of the wireless device. In another embodiment, the one or more supplemental criteria include power consumption at the wireless device. In another embodiment, the one or more supplemental criteria include a network deployment scenario of the cellular communications network. In another embodiment, the one or more supplemental criteria include a location of the wireless device with respect to the at least one interfering cell. In another embodiment, the one or more supplemental criteria include a frequency error between the desired cell and the at least one interfering cell.

In one embodiment, a node associated with a cellular communications network includes a processor configured to make a determination to trigger interference mitigation at a wireless device based on a signal load in at least one interfering cell from which transmissions result in interference at the wireless device during reception from a desired cell, a relation between reference signals used in the desired cell and the at least one interfering cell, and a timing relation between at least one of a group consisting of: signals transmitted by the desired cell and the at least one interfering cell and signals received at the wireless device from the desired cell and the at least one interfering cell. The processor is further configured to trigger interference mitigation at the wireless device in response to making the determination to trigger interference mitigation at the wireless device.

In one embodiment, the node is the wireless device. In another embodiment, the node is a network node of the cellular communications network. In one embodiment, the network node is a radio access node. Further, in one embodiment, the radio access node is a base station of a serving cell of the wireless device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates one example of a cellular communications network operating according to one embodiment of the present disclosure;

FIGS. 2A and 2B illustrate one example of colliding reference signals and non-colliding reference signals, respectively;

FIGS. 4A and 4B illustrate two examples of performing interference and channel estimation at a wireless device;

DETAILED DESCRIPTION

Figure 2A:
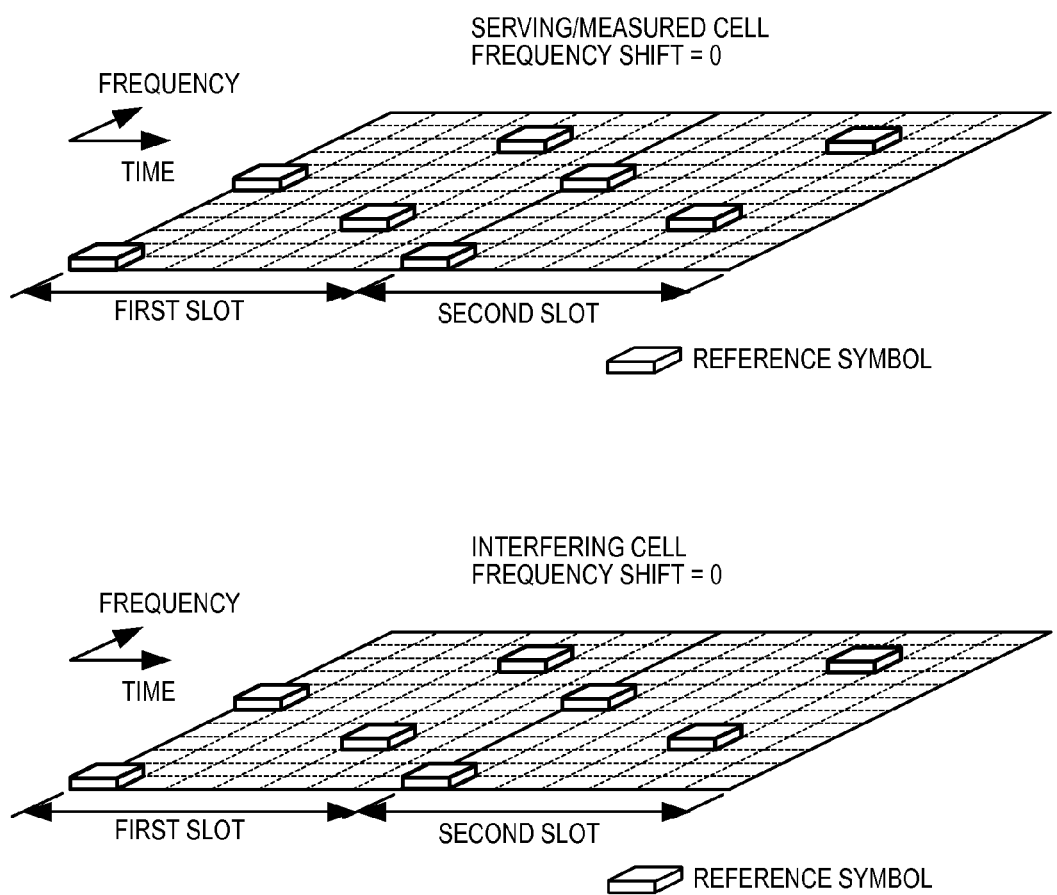

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, the following definitions are beneficial.

Radio network node: As used herein, the non-limiting term "radio network node" is used to refer to any type of network node serving a wireless communication device (e.g., an instance of a User Equipment device (UE)) and/or connected to other network node(s) or network element(s). Examples of radio network nodes include a Base Station (BS), a Multi-Standard Radio (MSR) radio node such as MSR BS, a node B, an enhanced Node B (eNB), a network controller, a radio network controller, a BS controller, a relay, a donor node a controlling relay, a Base Transceiver Station (BTS), an Access Point (AP), etc.

Network node: As used herein, the non-limiting term "network node" is also used to refer to any type of radio network node or any network node which communicates with at least a radio network node. Such nodes may not themselves necessarily be capable of wireless communication. Examples of network nodes are any radio network node stated above, a core network node (e.g., a Mobile Switching Centre (MSC), a Mobility Management Entity (MME), etc.), an Operations and Management (O&M) node, an Operation Support System (OSS), a Self Organizing Network (SON), a positioning node (e.g., an Evolved Serving Mobile Location Centre (E-SMLC)), Minimization of Drive Test (MDT), etc.

UE or wireless device: The terms UE and wireless device (or wireless communication device) are used interchangeably herein. As used herein, the non-limiting term wireless device is used to refer to any type of wireless device capable of communicating with a radio network node in a cellular or mobile communication system. Examples of a wireless device include a target device, a device-to-device UE, a machine type UE or UE capable of machine to machine communication, a Personal Digital Assistant (PDA), an iPad®, a tablet computer, a mobile terminal, a smart phone, a Laptop Embedded Equipment (LEE), a Laptop Mounted Equipment (LME), a Universal Serial Bus (USB) dongles, etc. In particular implementations, the wireless devices described herein may not support a full range of conventional communication capabilities and may provide only a subset of the capabilities supported by conventional wireless devices. For instance, the wireless devices described herein may only be capable of communication in a particular direction (e.g., uplink/transmission only, downlink/reception only) or may only be capable of communicating specific information or types of information. Examples of such wireless devices may include wireless meters or sensors, wireless-capable equipment, and Radio Frequency Identification (RFID) tags.

Interference mitigation: The terms "interference mitigation receiver," "interference cancellation receiver," "interference suppression receiver," "interference rejection receiver," "interference aware receiver," "interference avoidance receiver," etc. are interchangeably used but they all belong to a category of an advanced receiver or an enhanced receiver. Interference cancellation or suppression by such advanced receiver structures can lead to the elimination of the interference, in which case the interference is completely cancelled, whereas in other cases the impact of interference on the useful signal is reduced. Interference mitigation refers to the receiver's ability to mitigate (i.e., cancel, suppress, or otherwise mitigate) the interference caused by at least certain signals received at the wireless receiver from at least one interfering cell. An interfering cell is also referred to herein as an aggressor cell.

Interfering cell: A cell, which is a neighbor to the serving cell of the wireless device or to any cell measured by the wireless device, and from where the wireless device receives at least certain type of interfering signals. An interfering cell is also interchangeably referred to herein as an aggressor cell or a dominant neighboring cell.

The present disclosure relates to interference mitigation in a cellular communications network (which may also be referred to as a wireless cellular network or simply a cellular network). Embodiments are disclosed for network assisted interference mitigation by exploiting interference mitigation capabilities in the wireless device, or UE, side. Among other things, interference mitigation can be used to assist signal demodulation at the receiver of the wireless device and to improve channel quality estimation.

The embodiments described herein focus on interference mitigation in the downlink direction. However, the embodiments described herein can be extended to additionally or alternatively provide interference mitigation in the uplink direction as well. In addition, some of the embodiments discussed herein focus on $3^{rd}$ Generation Partnership Project (3GPP) Long Term Evolution (LTE) and, in particular, to Cell-Specific Reference Signal (CRS) and CRS Interference Cancellation (IC-CRS) from LTE Release 11 (Rel-11). However, the embodiments described herein can be generalized to any suitable system (e.g., any suitable cellular communications network and/or any suitable type of reference signals and associated interference mitigation). Certain aspects of the disclosed embodiments are especially advantageous to systems that utilize overlapping pilot signals for interference estimation/mitigation and support interference cancellation/mitigation mechanisms on those pilot signals. Furthermore, the embodiments disclosed herein can be generalized to cover any other future wireless standard where interference estimation takes place.

Accurate interference estimation is a very complex and important process taking part in both signal demodulation and Channel Quality Indication/Index (CQI) estimation for link adaptation. Accurate interference estimation means that the receiver can deduct the interference correctly from the total received signal and hence improve demodulation performance. In addition, the receiver can provide a good estimate of the radio environment and thus select an appropriate Modulation and Coding Scheme (MCS) that can maximize the link performance.

Typically, interference estimation is done on Resource Elements (REs) where a serving cell does not transmit data. In LTE Releases 8 up to 10, interference estimation for CQI estimation is based on REs carrying the CRSs. If the CRS positions in the frequency domain are non-shifted with respect to CRS positions of interfering neighbor cell(s), then a rather high bias is introduced in the interference estimation, which leads to unacceptable overestimated interference levels. This is especially the case when a traffic level in the interfering cell(s) is low (i.e., in low loaded networks). In LTE Rel-11, the possibility of IC on the CRS REs (IC-CRS) in the UE terminal side was introduced. IC-CRS can indeed lower the aforementioned bias. Nevertheless, there are cases where IC-CRS can increase the gap between actual and estimated interference. For example, in the case of a fully loaded network, applying IC-CRS and removing some interferers on the CRS REs will lead to a situation where interference is underestimated. Hence, there is a need for systems and methods that assist interference estimation by appropriately utilizing the IC-CRS UE capability.

Further, in general, inter-cell interference mitigation of signals from the neighboring interfering cells at the wireless device receiver enhances downlink reception quality. For example, reception of the data channel and/or control channels (e.g., Physical Downlink Shared Channel (PDSCH), Physical Downlink Control Channel (PDCCH), Physical Hybrid Automatic Repeat Request Indicator Channel (PHICH), Physical Control Format Indicator (PCFICH), etc.) at the wireless device can be enhanced if the interference caused by signals (e.g., CRS, etc.) transmitted by the interfering cells on these channels can be partly or fully mitigated. Due to network planning in homogeneous networks, the CRS do not collide (i.e., radio resources used for CRSs do not overlap) between the closest neighbor cells. Therefore, typically in such a planned homogeneous network, some of the REs of the data channel and/or control channels in a serving cell of the wireless device will collide with the REs containing CRS in one or a few strongest neighbor/interfering cells. It is therefore beneficial to cancel interference resulting from the transmission of CRS or any type of reference signal in such interfering cells on REs that overlap with the data or control channels in the serving cell.

However, even when CRS in neighboring cells do not collide, substantial performance improvement is achieved when the interference cancellation is applied only in a certain network configuration(s) and loading situation (s). Furthermore, in a homogeneous network or in any type of network deployment where no resource partitioning between victim and aggressor cells is used, the wireless device will typically have to continuously cancel interference in all subframes. Even in a heterogeneous network, the larger part of the network is homogeneous (i.e., includes a single layer cell layout). Therefore, the drawback of continuous interference cancellation is the impact on the power consumption, processing, memory, and complexity in general at the wireless device.

Normally, IC is used without taking into account all important conditions under which both performance gain is achieved and without any regard to the impact on wireless device power consumption and complexity. However, as discussed below, systems and methods are disclosed herein for triggering IC, or mitigation, at the wireless device in response to certain conditions such as, e.g., the traffic load in the aggressor cells and relation of signal characteristics between the serving and aggressor cells. This in turn leads to more accurate interference measurement for deriving channel quality (e.g., CQI), resulting in higher user throughputs.

In this regard, FIG. 1 illustrates one example of a cellular communications network 10 operating according to one embodiment of the present disclosure. As illustrated, the cellular communications network 10 includes a number of base stations 12-1, 12-2, and 12-3 and a wireless device 14. Note that while only three base stations 12 and one wireless device 14 are illustrated in the example of FIG. 1, the cellular communications network 10 may include any number of base stations 12 and wireless devices 14. Note that while the description of some of the embodiments below uses 3GPP LTE terminology (e.g., CRS, IC-CRS, etc.), the embodiments described herein can be used in any suitable type of cellular network. Further, while some of the embodiments relate to interference resulting from transmission of CRS, the embodiments are equally applicable to other types of reference or pilot signals.

In one embodiment, the wireless device 14 is connected to a cell served by the base station 12-1. In this case, the cell served by the base station 12-1 is referred to as a serving cell of the wireless device 14. In another embodiment, the wireless device 14 is performing measurements on the cell served by the base station 12-1, in which case the cell is referred to as a measured cell of the wireless device 14. Thus, the cell served by the base station 12-1 is sometimes referred to more generally as a desired cell of the wireless device 14 in order to cover both of the aforementioned embodiments. As such, as used herein, a desired cell is a serving cell of the wireless device 14, a measured cell of the wireless device 14, or any other cell from which a received signal at the wireless device 14 is interfered with by transmissions from the interfering cell(s).

Cells served by the base stations 12-2 and 12-3 are interfering, or aggressor cells, in that transmissions by the base stations 12-2 and 12-3 result in interference during reception of the downlink for the desired cell at the wireless device 14. More specifically, the transmission of reference signals (e.g., CRSs), which are generally transmitted at a maximum transmit power level, by the base stations 12-2 and 12-3 for the interfering cells results in downlink interference at the wireless device 14 for the downlink from the base station 12-1 for the desired cell. Radio resources (e.g., REs) utilized for the transmission of the reference signals by the base stations 12-2 and 12-3 for the interfering cells may overlap or coincide with the radio resources utilized for the transmission of the reference signal by the base station 12-1 for the desired cell. In this case, the reference signals of the desired and interfering cells are referred to herein as "colliding" or "non-shifted" reference signals. Conversely, radio resources (e.g., REs) utilized for the transmission of the reference signals by the base stations 12-2 and 12-3 for the interfering cells may not overlap or not coincide (partially or completely) the radio resources utilized for the transmission of the reference signal by the base station 12-1 for the desired cell. In this case, the reference signals of the desired and interfering cells are referred to herein as "non-colliding" or "shifted" reference signals. Notably, as used herein, colliding reference signals are reference signals that fully or, in some embodiments, partly overlap in time and/or frequency. Conversely, non-colliding reference signals are reference signals that do not overlap in time and/or frequency.

FIGS. 2A and 2B illustrate one example of colliding reference signals and non-colliding reference signals, respectively. In this example, the reference signals are CRSs. In LTE, a CRS consists of a number of reference symbols, which are referred to herein as CRS symbols, of predefined values inserted within the first and third last Orthogonal Frequency Division Multiplexing (OFDM) symbol of each slot and with a frequency-domain spacing of six subcarriers. Furthermore, there is a frequency-domain staggering of three subcarriers for CRS symbols within the third last OFDM symbol. LTE defines six possible frequency shifts of the CRS symbols. In the example of FIG. 2A, both the serving/measured cell and the interfering cell (e.g., the cell of the base station 12-2) use a frequency shift of zero. As a result, CRS transmissions for the serving/measured cell and the interfering cell use the same REs and, as such, the CRSs are colliding. In contrast, in the example of FIG. 2B, the serving/measured cell uses a frequency shift for CRS of zero, whereas the interfering cell uses a frequency shift for CRS of two. As a result, CRS transmission for the serving/measured cell and the interfering cell use different REs and, as such, the CRSs are non-colliding.

Importantly, the wireless device 14 is capable of performing inter-cell interference mitigation using one or more inter-cell interference mitigation techniques (e.g., IC-CRS technique(s)) to mitigate inter-cell interference at a receiver of the wireless device 14 while the wireless device 14 receives a signal (e.g., a channel, a physical signal, performs a measurement, etc.) transmitted by the base station 12-1 for the desired cell. This inter-cell interference is caused by transmission of signals (e.g., reference signals) by the base stations 12-2 and 12-3 for the interfering cells. Notably, while only one serving/measured cell is described herein for ease of discussion, the wireless device 14 may perform interference mitigation for multiple serving/measured cells in a multi-carrier or Carrier Aggregation (CA) scheme. For example, in a multi-carrier scenario, embodiments disclosed herein are applicable to the reception of signals from each serving cell of the wireless device 14.

In order to perform inter-cell interference mitigation, the wireless device 14 must estimate the interference from the interfering cells. In LTE, the interference is estimated on the CRS transmitted in the downlink from the serving/measured cell. However, as discussed above, the CRSs from the interfering cells may or may not collide with the CRS of the serving/measured cell. For the colliding (or non-shifted) CRS scenario, the measured interference is based only on the CRS transmissions of the interfering cells. Since CRSs are transmitted within full power, the wireless device 14 will measure "high" interference independently of the traffic load in the interfering cells. Thus, such interference estimates are only accurate in scenarios where the traffic level in the interfering cells is high. Otherwise, such interference estimates overestimate the amount of interference. Conversely, in the non-colliding (or shifted) scenario, the measured interference is based on data transmissions from the interfering cells and, as such, the measured interference depends on the traffic level, or load, in the interfering cells. However, such interference estimates would underestimate interference in that they do not capture the impact of the shifted CRS transmissions of the interfering cells.

In order to address these issues, as discussed below, interference mitigation at the wireless device 14 is triggered only under certain conditions, e.g., non-colliding reference signals and high traffic level in the interfering cell(s). More specifically, interference mitigation at the wireless device 14 is triggered by first assessing one or more conditions under which the wireless device 14 should perform interference mitigation of at least a certain type of radio signals (e.g., CRS) received at its receiver from the interfering cell(s). The conditions are based on information related to, in some embodiments, the interfering cells, the serving/measured cell, the wireless device 14, and/or a relation between any combination of the wireless device 14, the interfering cells, and the serving/measured cell. When the condition(s) are satisfied, interference mitigation at the wireless device 14 is triggered. In one embodiment, the determination to trigger interference mitigation is made by a network node (e.g., the base station 12-1 of the serving/measured cell), and interference mitigation at the wireless device 14 is triggered by signaling, either explicitly or implicitly, an indication to the wireless device 14 enabling the wireless device 14 to initiate interference mitigation of radio signals (e.g., IC-CRS) from one or more of the interfering cell(s), as determined by assessing the condition(s). As a result, more accurate interference estimates are obtained for, e.g., deriving channel quality (e.g., CQI), which in turn results in higher user throughputs.

Before proceeding, it should be noted that the systems and methods disclosed herein are particularly applicable to scenarios when there is no resource partitioning between the serving/measured cell and interfering cell(s), e.g., when no low interference subframes or Almost Blank Subframes (ABSs) are configured or used in the interfering cell(s). Typically in a homogeneous network deployment, there is no resource portioning between the serving cell and interfering cell(s). However, there is no resource partitioning between the serving cell and interfering cell(s) even in some heterogeneous network configurations (e.g. when the serving cell is served by a High Power Node (HPN) (e.g., a macro BS) and the interfering cell(s) is served by a Low Power Node (LPN) (e.g., a micro, pico, or femto BS)).

Figure 3:
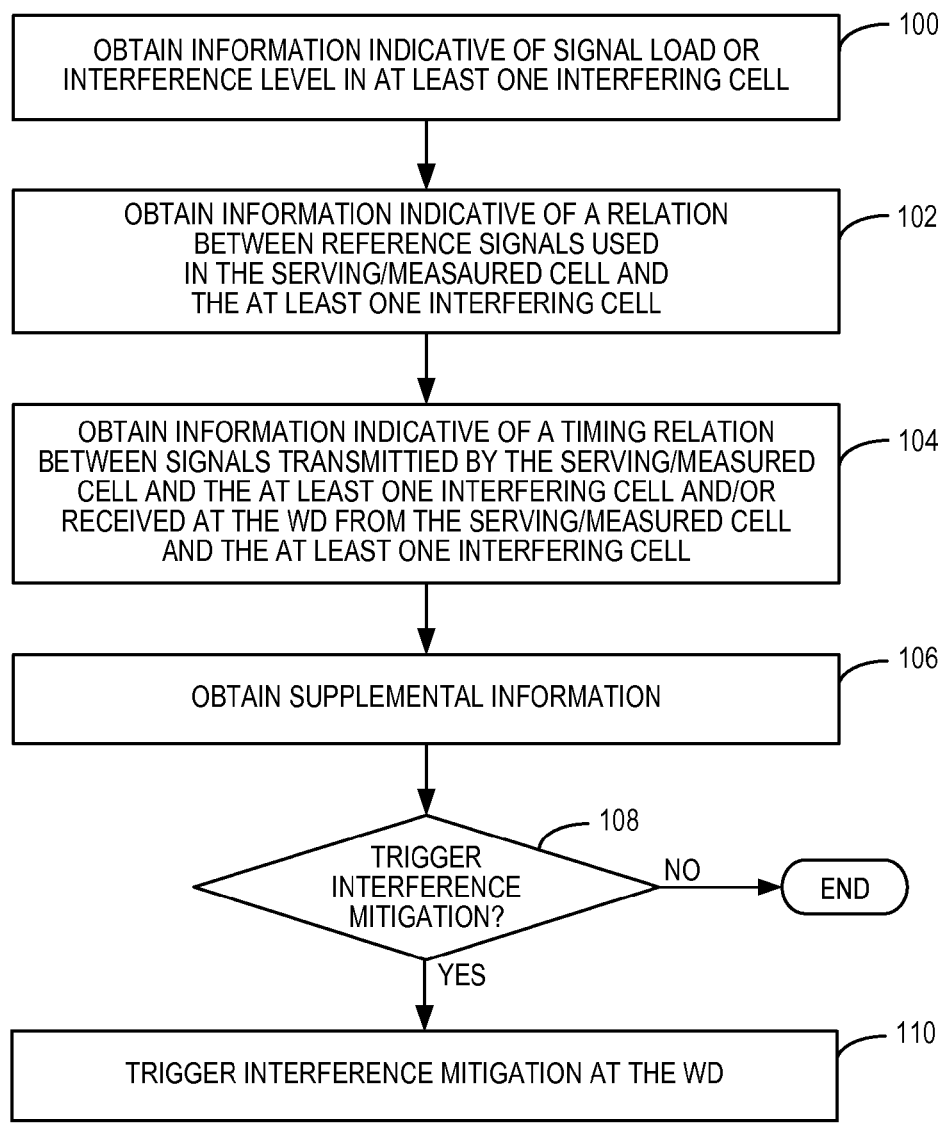
FIG. 3 is a flow chart that illustrates the operation of a node associated with the cellular communications network to trigger interference mitigation at a wireless device according to one embodiment of the present disclosure.

FIG. 3 is a flow chart that illustrates the operation of a node associated with the cellular communications network 10 to trigger interference mitigation at the wireless device 14 according to one embodiment of the present disclosure. This node may be a network node (e.g., a radio network node such as the base station 12-1 of the serving/measured cell) or the wireless device 14. Notably, while the "steps" of FIG. 3 are illustrated in a particular order, the "steps" may be performed in any desired order (or even concurrently) depending on the particular implementation, unless a specific ordering is explicitly or implicitly required. The same is true for all flow charts and similar diagrams included herein.

As illustrated, the node obtains information that is indicative of a signal load or interference level in at least one interfering cell (step 100). In the example of FIG. 1, there are two interfering cells. However, there may be any number of one or more interfering cells. This information may be, for example, any metric that can depict the load of a transmitted signal in the interfering cells and/or signal quality received at the wireless device 14 from the interfering cells. The interference level of an interfering cell means the interference experienced by the wireless device 14 at the receiver of the wireless device 14 is caused by the interfering cell. The node also obtains information that is indicative of a signal relation between reference signals used in the serving/measured cell and the interfering cells (step 102). In one embodiment, the signal relation is either colliding or non-colliding. For example, in one embodiment, the reference signals are CRS, and the signal relation is either colliding or non-colliding CRSs.

Still further, the node obtains information that is indicative of a timing relation between signals transmitted by the base station 12-1 for the serving/measured cell and by the base stations 12-2 and 12-3 for the interfering cells and/or a timing relation between signals received at the wireless device 14 from the serving/measured cell and the interfering cells (step 104). In one example, the timing relation is defined as a maximum absolute deviation in frame start timing between any pair of desired and interfering cells that have overlapping coverage areas. Note that while steps 100-104 are all performed in this example, the present disclosure is not limited thereto. In some embodiments, all three of these steps may not be performed (e.g., only steps 100 and 102 may be performed or only steps 100 and 104 may be performed or only steps 102 and 104 may be performed).

Optionally, in some embodiments, the node also obtains supplemental information (step 106). The supplemental information may, in some embodiments, include one or more of the following: information that is indicative of a signal operation type at the wireless device 14 (e.g., channel estimation, interference estimation, etc.), information that is indicative of a battery life of the wireless device 14, information that is indicative of power consumption of the wireless device 14, information that is indicative of a network deployment scenario experienced by the wireless device 14 (e.g., homogeneous or heterogeneous), information that is indicative of a location, or position, of the wireless device 14 with respect to the interfering cells, and information that is indicative of a frequency error between the serving/measured cell and the interfering cells.

The node determines whether to trigger interference mitigation at the wireless device 14 based on one or more predefined criteria and at least some of the information obtained in steps 100-106 (step 108). In other words, the node accesses one or more conditions under which the wireless device 14 should perform interference mitigation of at least a certain type(s) of radio signals (e.g., CRS) received at the receiver of the wireless device 14 from the interfering cells, as defined by the one or more predefined criteria, based on the information. In one embodiment, the node determines that interference mitigation is to be triggered only if all of the predefined criteria are satisfied. More specifically, in one embodiment, the predefined criteria, or in other words the conditions, for triggering interference mitigation at the wireless device 14 include one or more criteria based on any one or a combination of (and in one embodiment all of): an interference mitigation capability of the wireless device 14, a signal load or interference level in the interfering cell(s), a signal relation between the desired cell and the interfering cell(s), and a timing relation between the desired cell and the interfering cell(s).

If the node determines that interference mitigation is not to be triggered, the process ends. Optionally, the process may be repeated as desired. If the node determines that interference mitigation is to be triggered at the wireless device 14, the node then triggers interference mitigation at the wireless device 14 (step 110). Notably, depending on the particular embodiment, interference mitigation may be triggered for all of the interfering cells or only the interfering cell(s) for which the predefined criteria are satisfied. The manner in which the node triggers the interference mitigation can vary depending on the particular embodiment. More specifically, in one embodiment, the node is the wireless device 14, and the wireless device 14 triggers interference mitigation locally at the wireless device 14. In another embodiment, the node is a network node, and the network node triggers interference mitigation at the wireless device 14 by either implicit or explicit signaling to the wireless device 14. This signaling indicates to the wireless device 14 that the wireless device 14 is to activate interference mitigation, at least with respect to one or more identified interfering cells.

An example of implicit signaling is an existing Information Element (IE) in 3GPP LTE called "CRS assistance information." The CRS assistance information contains information about the interfering cells, as described above. In some embodiments, the wireless device 14 performs IC-CRS or interference mitigation of specific signals provided that the wireless device 14 is configured with at least the information about the interfering cells from the serving cell of the wireless device 14 (e.g., configured via the CRS assistance information). For instance, a standard or configuration may require the wireless device 14 to perform IC-CRS or interference mitigation of specific signals provided that the wireless device 14 is configured with at least the information about the interfering cells from the serving cell of the wireless device 14 (e.g., configured via the CRS assistance information). As another example, it may additionally or alternatively be predefined that the wireless device 14 shall meet one or more sets of predefined requirements provided that the wireless device 14 receives at least the information about the interfering cells from the serving cell (e.g., CRS assistance information). Examples of predefined requirements are UE performance requirements of data (e.g., PDSCH) and/or control channels (e.g. PDCCH/PHICH/PCFICH), Channel State Information (CSI) measurements (e.g., CQI), etc. Thus, in this example, the network node may implicitly trigger interference mitigation at the wireless device 14 by signaling corresponding CRS assistance information to the wireless device 14.

An example of explicit indication is an indicator that indicates that the wireless device 14 is to activate interference mitigation. For example, in its simplest form, the explicit indication can be expressed in terms of a Boolean or binary parameter, e.g., with two levels such as 0 and 1 representing deactivate interference mitigation and activate interference mitigation, respectively. The indication may also indicate whether interference mitigation is to be applied to specific type of signals or channels (e.g., CRS, Primary Synchronization Signal (PSS)/Secondary Synchronization Signal (SSS), Physical Broadcast Channel (PBCH), etc.) or on all signals or channels of the interfering cells. The indication may also contain additional information such as information that informs the wireless device 14 whether the wireless device 14 has to mitigate the interference on all channels of the desired cell, on a data channel of the desired cell, on control channels of the desired cell, or only on selected channels (e.g., PDSCH, PDCCH, etc.) of the desired cell. The indication may also contain additional information informing the wireless device 14 of frequency and/or time domain physical resources on which the wireless device 14 is to perform interference mitigation. For example, a cell can be active in only half of the available system bandwidth. So, a bitmap showing the used resources in the frequency domain can be used. In that case, the wireless device 14 can perform interference mitigation only in the corresponding parts of the frequency domain. The indication may also contain information on whether interference mitigation assisted information should be used for interference measurements or for demodulation. In most of the above cases, the explicit indicator may be signaled to the wireless device 14 via a new Radio Resource Control (RRC) signaling.

Now, a detailed discussion of the predefined criteria used to determine whether to trigger interference mitigation at the wireless device 14 is provided. The predefined criteria (or conditions) includes one or more primary criteria and, in some embodiments, one or more supplemental criteria. The one or more primary criteria are based on one or more of the following: a capability of the wireless device 14 to perform interference mitigation, signal load or interference level in the interfering cells, signal relation between the desired and interfering cells, and timing relation between the desired and interfering cells, each of which is discussed below.

Interference mitigation capability of the wireless device 14: The interference mitigation capability of the wireless device 14 may be determined by, for example, a UE category of the wireless device 14. Based on this information, a predefined criterion for triggering interference mitigation at the wireless device 14 may be that the wireless device 14 is capable of performing interference mitigation or capable of performing interference mitigation on a desired type(s) of special signal. If step 108 is performed in a network node, such a criterion would avoid, e.g., transmission of unnecessary interference mitigation related information to the wireless device 14 if the wireless device 14 is not capable of performing the desired interference mitigation.

In one embodiment, the node performing the process of FIG. 3 is a network node, where the network node may obtain information indicative of the interference mitigation capability of the wireless device 14 from the wireless device 14 or another network node. More specifically, in one embodiment, the wireless device 14 informs the cellular communications network 10 (i.e., a network node such as, for example, the base station 12-1) of a type of receiver with which the wireless device 14 is equipped and/or informs the cellular communications network 10 if the wireless device 14 has the capability to perform interference mitigation. The wireless device 14 can further inform the cellular communications network 10 of the type(s) of signals on which the wireless device 14 can perform interference mitigation (e.g., CRS, PSS, SSS, etc.). In another embodiment, the node performing the process of FIG. 3 is the wireless device 14. In this case, the wireless device 14 has knowledge of whether it has interference mitigation capability.

Signal load or interference level in the interfering cells: This information may be, for example, any metric that can depict the load of a transmitted signal in the interfering cells and/or signal quality received at the wireless device 14 from the interfering cells. The interference level of an interfering cell means the interference experienced by the wireless device 14 at the receiver of the wireless device 14 is caused by the interfering cell. Examples of metrics or information that are indicative of the signal load or interference level in an interfering cell include: radio node transmit power (e.g., a transmit power of the base station 12-2/12-3 serving the interfering cell), received signal quality at the wireless device 14 with respect to the interfering cell (e.g., Reference Signal Received Quality (RSRQ) measured on interfering cell), utilization of radio resources at the radio node (e.g., base station) serving the interfering cell (e.g., usage of physical Resource Blocks (RBs), REs, etc.), transmission intensity of data (e.g., PDSCH) and/or control channel (e.g., PDCCH, PHICH, etc.) from the interfering cell.

The predefined criteria for triggering interference mitigation at the wireless device 14 for a particular interfering cell may include one or more criteria based on the signal load and/or interfering level in the interfering cells. For example, the predefined criteria may include a criterion that interference mitigation at the wireless device 14 is to be triggered for the interfering cell if the signal load or interference level in the interfering cell if the signal load or interference level for the interfering cell meets a defined condition, e.g., is below certain threshold. This threshold may be indicative of a low or medium load, or traffic level, in the interfering cell. This criterion may, in one embodiment, be combined with a criterion that the reference signals of the desired and interfering cells be non-colliding. As one particular example, the criterion may be that interference mitigation at the wireless device 14 is to be triggered for the interfering cell if the reference signals are non-colliding and the average resource utilization in the interfering cell is below 30%, i.e., only 30% of the Physical Resource Blocks (PRBs) in the downlink for the interfering cell are used on average. This condition may be checked for all interfering cells, e.g. N strongest interfering cells of the wireless device 14. In one embodiment, interference mitigation is triggered only if all of the N strongest interfering cells satisfy this condition (as well as any other conditions). In another embodiment, interference mitigation is triggered on a per interfering cell basis such that interference mitigation for a particular interfering cell is triggered if the condition(s) (i.e., the predefined criteria) are satisfied for that interfering cell.

The information that is indicative of the signal load or interference level in the interfering cells may be obtained by the node in any suitable manner. In one embodiment, the node is a network node, and the network node obtains the aforementioned information from information or measurements received from the interfering cell and/or from the wireless device 14 (e.g., RSRQ). In another embodiment, the node is the wireless device 14, and the wireless device 14 obtains the aforementioned information by, for example, obtaining a signal quality (e.g., RSRQ, Signal-to-Interference plus Noise Ratio (SINR), etc.) of the signals received from the interfering cells. As another example, the wireless device 14 may receive explicit information from a serving cell of the wireless device 14 regarding the signal load of the interfering cell(s) (e.g., average transmit power). The signal load or interference level can be estimated over a certain time period, e.g. 200 Milliseconds (ms).

Signal relation between the desired cell and the interfering cells: The one or more predefined criteria may additionally or alternatively include at least one criterion that is based on the signal relation between the desired cell and the interfering cells. This signal relation refers to the relation between time-frequency locations of the reference signals used by the desired cell and the interfering cell(s). An example is whether the CRS transmitted by the desired cell and the interfering cell are colliding or non-colliding. The collision of the CRS occurs when the REs containing the CRS in the desired and interfering cells overlap in both time and frequency. The collision of the CRS can be avoided by shifting the CRS in the frequency domain between the desired and the interfering cells. This is done during network planning and is therefore not changed frequently. The node therefore checks whether the CRS are colliding or not between the desired and interfering cells of the wireless device 14.

In one example, the predefined criteria include a criterion that interference mitigation at the wireless device 14 for an interfering cell is to be triggered when the CRS of the desired cell and the interfering cell are not colliding. This may be particularly beneficial when it is desired to reduce interference on the downlink data and/or control channels at the wireless device 14. As another example, if it is desirable to enhance channel estimation (e.g., based on CRS) and/or enhance CSI performance (e.g., also based on CRS) at the wireless device 14, then the predefined criteria may include a criterion that interference mitigation is to be triggered at the wireless device 14 for an interfering cell if the CRS for the desired cell and the interfering cell are colliding. Typically, it is more desirable to mitigate the interference on the data and/or control channels especially at low loads, or low traffic levels, in the interfering cell(s) due to the large impact of CRS transmissions in the interfering cell(s) for the shifted CRS scenario. Therefore, interference mitigation may be triggered more commonly, or frequently, at the wireless device 14 when the CRSs do not collide.

Note that, in 3GPP LTE, the colliding and non-colliding CRS can be expressed mathematically using a mod x operation. In case of a single antenna in a base station, there are six possible frequency shifts to avoid CRS collision. As an example, if CRS used in cell 1 and cell 2 collide, then the relation between their Physical Cell Identities (PCIs) #1 and #2 can be expressed as a mod 6 operation. In another example, if CRS used in cell 3 and cell 4 do not collide, then the relation between their PCIs #3 and #4 can also be expressed as a mod 6 operation. These examples are expressed mathematically below:

Colliding CRS between cell 1 and cell 2: (PCIcell–PCIcell2)mod 6=0; and

Non-colliding CRS between cell 3 and cell 4: (PCIcell3–PCIcell4)mod 6 !=0.

In one embodiment, the node is a network node, and the network node obtains information that is indicative of the signal relation between the reference signals of the desired and interfering cell(s) from another network node, the wireless device 14, or a combination thereof. For example, the network node may obtain the PCIs of the desired and interfering cell(s) and, based on the PCIs, determine whether the reference signals of the desired and interfering cell(s) are colliding or non-colliding using, e.g., a mod x operation, as described above. In another embodiment, the node is the wireless device 14, and the wireless device 14 obtains information that is indicative of the signal relation between the reference signals of the desired and interfering cell(s) from one or more network node (e.g., the base stations 12-1, 12-2, and 12-3 of the serving and interfering cells, respectively). For example, the wireless device 14 may obtain the PCIs of the desired and interfering cell(s) during synchronization or cell search and, based on the PCIs, determine whether the reference signals of the desired and interfering cell(s) are colliding or non-colliding using, e.g., a mod x operation, as described above.

Timing relation between the desired and interfering cells: The one or more predefined criteria may additionally or alternatively include at least one criterion that is based on a timing relation between the desired and interfering cell(s). This timing refers to a timing relation between signals transmitted by the desired cell and the interfering cell(s) and/or a timing relation between signals received at the wireless device 14 from the desired cell and the interfering cell(s). This timing relation is also interchangeably referred to as a transmit time synchronization or transmit time alignment between the signals transmitted by the desired cell and the interfering cell(s). This timing relation is also interchangeably referred to as a cell phase synchronization accuracy. In one example, the timing relation is defined as a maximum absolute deviation in frame start timing between any pair of desired and interfering cells that have overlapping coverage areas. Typically, the transmit time alignment between cells can be in the order of 1-10 Microseconds (μs).

Typically, the wireless device 14 has a single receiver (e.g., a single Inverse Fast Fourier Transform (IFFT)/Fast Fourier Transform (FFT)). Therefore, the wireless device 14 can perform interference mitigation of signals received from the interfering cell(s) provided these interfering signals and signals of the desired cell arrive at the receiver of the wireless device 14 well within the Cyclic Prefix (CP) length (e.g., 4.7 μs for normal CP). Therefore, the receive time difference of signals at the wireless device 14 should be within 1-2 μs. Thus, as one example, the predefined criteria for triggering interference mitigation at the wireless device 14 for an interfering cell may include a criterion that the timing relation between the desired cell and interfering cell is such that the wireless device 14 can perform the interference mitigation using single receiver (e.g., the timing relation is well within the CP length at the receiver of the wireless device 14). Otherwise, interference mitigation is not triggered at the wireless device 14. In a typical scenario, the wireless device 14 is in a cell border region of the desired cell. In a synchronized homogeneous network, the receive time difference of signals at the wireless device 14 from the desired and interfering cells is small since cells are of the same size. Therefore, in such a scenario if cells are synchronized (i.e., the transmit time is 1-3 μs), then the node can decide to activate interference mitigation at the wireless device 14.

In one embodiment, the node performing the process of FIG. 3 is a network node, and the network node determines the timing relation between the cells based on predetermined information, or the network node can acquire this from another node (e.g., another network node) that has this information. For example, a lookup table mapping the transmit time relation between a pair of cells in the coverage area and their cell identifiers (e.g., cell IDs) can be stored in a network node. The receive time difference of signals received at the wireless device 14 from the serving and interfering cells can be determined by the network node explicitly based on a measurement report from the wireless device 14 or implicitly by knowing a location of the wireless device 14.

In the embodiment where the node performing the process of FIG. 3 is a network node, the network node can also obtain the receive time difference measurement of pairs of cells from the wireless device 14. This measurement can be performed by the wireless device 14 for the signals received at the receiver of the wireless device 14 from the desired and interfering cell(s). An example of such measurement is a Reference Signal Time Difference (RSTD) measurement performed on a Positioning Reference Signal (PRS) by the wireless device 14 for Observed Time Difference of Arrival (OTDOA) positioning. This measurement report can more accurately depict whether the wireless device 14 can perform the interference mitigation of signals from a certain interfering cell or not. Therefore, the network node can use these measurement results and/or also transmit time difference at the radio nodes to decide whether to trigger interference mitigation at the wireless device 14 and also to decide if the interfering cells are to be included in assistance information sent to the wireless device 14 for interference mitigation. The network node may even take into account the radio channel characteristics (e.g., multipath delay profile) to determine or predict expected spread of signals from the desired and interfering cells at the receiver of the wireless device 14. If the channel has a very high delay spread (e.g., 2 μs), then the network node may decide not to trigger interference mitigation at the wireless device 14 unless the desired and interfering cells are of small size, e.g., 100-200 meters. The radio channel characteristics can be determined on signals sent by the wireless device 14 in the uplink for the serving cell of the wireless device 14.

In another embodiment, the node performing the process of FIG. 3 is the wireless device 14, and the wireless device 14 determines the timing of each cell during synchronization or during cell search. Based on the determined timing, the wireless device 14 determines the timing relation between the signals received at its receiver from the desired and interfering cells. The wireless device 14 may also determine the CP length of the desired and interfering cells during cell search.

As discussed above, in some embodiments, the predefined criteria (or conditions) include one or more supplemental criteria in addition to the one or more primary criteria. The one or more supplemental criteria are based on one or more of the following: signal operation type of the wireless device 14, battery life of the wireless device 14, power consumption of the wireless device 14, network deployment scenario, location of the wireless device 14 with respect to the interfering cells, and frequency error between the desired and interfering cells, each of which is discussed below.

Signal operation type: Examples of the signal operation type of the wireless device 14 include channel estimation, interference estimation, demodulation, and CSI (e.g., CQI) assessment. As discussed below, the predefined criteria for triggering interference mitigation at the wireless device 14 may include one or more criterion based on the signal operation type at the wireless device 14. For example, if the signal operation type is interference estimation, the node may trigger interference mitigation at the wireless device 14 for only inactive interfering cell(s) prior interference estimation. In contrast, the node may trigger interference mitigation for both active and inactive interfering cells prior to channel estimation. If the node performing the process of FIG. 3 is the wireless device 14, the wireless device 14 may use one or more predefined criteria based on signal operation type to perform interference mitigation of signals only from suitable interfering cells, i.e., which will lead to improved reception quality of signals from the desired cell.

In one embodiment, the node performing the process of FIG. 3 is a network node. The network node can determine the signal operation type of the wireless device 14, whether it uses CRS or some other type of reference signals (e.g., Demodulation Reference Signal (DMRS), Channel State Information—Reference Symbol (CSI-RS), etc.) for channel estimation and/or interference estimation, based on, e.g., one or more of the following:

Predefined behavior of the wireless device 14 such as, e.g., using a certain type of reference signal for channel estimation as defined by a standard.

Predefined requirements for the wireless device 14, e.g., wireless device PDSCH demodulation requirements that require the wireless device 14 to use a certain type of reference signal for channel estimation are specified for a certain antenna transmission mode in a corresponding standard (e.g., a new LTE standard).

Antenna transmission mode. For example, at least transmission modes 1-8 (e.g., transmit diversity, spatial diversity, closed loop scheme, etc.) use CRS for channel and/or interference estimation. Since the cellular communications network 10 configures the wireless device 14 with a certain antenna mode, the network node knows (or can know) the antenna mode currently used by the wireless device 14.

Explicit indication from the wireless device 14 such as, for example, an explicit indication from the wireless device 14 that the wireless device 14 uses CRS for channel estimation.

In another embodiment, the node performing the process of FIG. 3 is the wireless device 14. The wireless device 14 performs interference mitigation and channel estimation. Therefore, the wireless device 14 can retrieve this information locally (e.g., from its own processing unit).

Battery life or power consumption: In a homogeneous network, the wireless device 14 is expected to perform interference mitigation to mitigate the interference caused by the interfering signals from the interfering cells continuously, at least most of time, or whenever the wireless device 14 is served or performs measurements. This is because traffic load in a homogeneous network is much higher than that in a heterogeneous network. Even in a heterogeneous network, in principle, the wireless device 14 is required to monitor the reception of downlink channels (e.g., PDCCH) in all subframes. However, in a heterogeneous network, the wireless device 14 performance requirements (e.g., PDCCH, PDSCH reception performance, etc.) are defined in subframes which overlap with ABS in interfering cell(s). However, in a homogeneous network, the wireless device 14 has to listen to the control channel (e.g., PDCCH monitoring) in all downlink subframes of the serving cell and can therefore be served in all downlink subframes in a radio frame of the serving cell. The interference mitigation requires more power consumption, memory, and processing at the wireless device 14.

Therefore, in one embodiment, the predefined criteria for triggering interference mitigation at the wireless device 14 include one or more criteria based on the battery life and/or power consumption at the wireless device 14. The one or more criteria may be defined trigger or not trigger interference mitigation at the wireless device 14 in such a manner as to avoid battery drainage at the wireless device 14. For example if the battery life at the wireless device 14 is below a threshold, then the node may not trigger interference mitigation at the wireless device 14.

In one embodiment, the node performing the process of FIG. 3 is a network node, and the network node can obtain information indicative of the battery life of the wireless device 14 by, for example, explicitly receiving a current, or present, battery level (e.g., absolute value in terms of watts, discrete power levels such as low, medium, and high, etc.) from the wireless device 14. The network node can also implicitly determine a state of the battery life of the wireless device 14 by, for example, observing an activity level of the wireless device 14 over a past time period (T0). For example, if the wireless device 14 is receiving data over the last certain number of frames (e.g., 100-200), then the network node may implicitly assume that the battery life of the wireless device 14 is low.

In another embodiment, the node performing the process of FIG. 3 is the wireless device 14. The wireless device 14 can explicitly determine the current battery life of the wireless device 14 and/or estimate an expected power consumption at the wireless device 14 if interference mitigation is triggered. In one example, the wireless device 14 may decide to trigger interference mitigation only if battery life at the wireless device 14 is above a threshold.

Network deployment scenario: The network deployment scenario characterizes whether the desired and interfering cells belong to a homogeneous network or a heterogeneous network. For example, if the desired and interfering cells are of the same type (e.g., macro cells), then the network deployment scenario is assumed to be homogeneous. Otherwise, the network deployment scenario is assumed to be heterogeneous. The cell type is characterized by one or more attributes such as power class of the radio network node serving the cell, cell size (e.g., cell radius, inter-site distance between cells, cell range, etc.), etc.

In one embodiment, the predefined criteria for triggering interference mitigation at the wireless device 14 include one or more criterion based on the network deployment scenario. For example, a criterion may be defined such that the node triggers interference mitigation provided that the desired cell and the interfering cell(s) are homogenous (e.g., provided the cells are macro cells or the cells are pico cells). As another example, a criterion may be defined such that the node triggers interference mitigation at the wireless device 14 in some heterogeneous network scenarios such as, e.g., when the desired cell is served by a HPN (e.g., a macro cell) and the interfering cell(s) is served by an LPN (e.g., a pico cell). In this case, no low interference subframes (e.g., ABS) are needed in the interfering cells.

In one embodiment, the node performing the process of FIG. 3 is a network node. The network node can determine the network deployment scenario of the desired and interfering cells based on, e.g., predetermined information or information received from another node (e.g., O&M, OSS, SON, etc.).

In another embodiment, the node performing the process of FIG. 3 is the wireless device 14, and the wireless device 14 can determine the cell type (e.g., macro, pico, etc.) of the desired and interfering cells based on any of: radio measurements, acquisition of system parameters, a priori or historical knowledge, etc. In large cells, when in a cell border area, the signal level (e.g., a Path Loss (PL) measurement such as, e.g., PL=difference in Decibels (dB) between CRS Transmit (Tx) power (Decibel-Milliwatt (dBm))–Reference Signal Received Power (RSRP) (dBm)) is lower than that in small cells. The wireless device 14 may also read the system information of a cell to determine the value of the parameter that indicates a transmit power of certain signals, e.g., CRS. In large cells, the CRS transmit power is larger than that in a small cell. The wireless device 14 may also store cell type information obtained in the past. The wireless device 14 may decide to trigger interference mitigation when the desired and interfering cells are of certain types. In one example, the wireless device 14 may trigger interference mitigation when the desired and interfering cells are homogeneous (e.g., all are macro cells or all are pico cells). In another example, the wireless device 14 may trigger interference mitigation when the desired and interfering cells are served by a HPN and an LPN(s), respectively. In another example, the wireless device 14 may not trigger interference mitigation when the desired and interfering cells are served by an LPN and a HPN(s), respectively.

Location of the wireless device 14: The one or more predefined criteria for triggering interference mitigation at the wireless device 14 may also include one or more criterion based on the location of the wireless device 14 with respect to the interfering cells and/or the desired cell. Such a criterion enables the node to determine the severity of the interfering signals at the wireless device 14 received from the interfering cells. For example, if the wireless device 14 is in the cell border region of the desired cell, then the node may infer that the wireless device 14 is more severely affected by the interference from the interfering cells. One or more criterion may be defined such that the node triggers interference mitigation at the wireless device 14 in this case. The location of the wireless device 14 can be expressed in terms of, e.g., a geometry factor (e.g., a ratio of desired cell received power to interference), desired cell SINR, etc.

In one embodiment, the node performing the process of FIG. 3 is a network node, and the network node may determine the location of the wireless device 14 based on, e.g., one or more of the following: radio measurements performed by the wireless device 14 and location or positioning of the wireless device 14, e.g., based on positioning methods such as Enhanced Cell Identity (E-CID) measurements such as UE Receive (Rx)–Tx time difference, Assisted Global Navigation Satellite System (A-GNSS), OTDOA, etc. In another embodiment, the node performing the process of FIG. 3 is the wireless device 14, and the wireless device 14 can determine its location based on, e.g., a suitable radio measurement (e.g., relative RSRP between the desired and interfering cells), a suitable positioning method, etc. One or more criterion may be defined such that the wireless device 14 triggers interference mitigation, e.g., only if the wireless device 14 is in a cell border region (which is also known as the Cell Range Expansion (CRE)) of the desired cell. In this case, interference mitigation will enhance performance of the wireless device 14.

Frequency error between the desired and interfering cells: The predefined rules for triggering interference mitigation at the wireless device 14 may also include one or more criterion based on the frequency error between the desired and interfering cells. For example, the node may decide to trigger interference mitigation at the wireless device 14 provided that the frequency error between the desired and interfering cells is below a threshold, e.g., a maximum difference threshold of 200 Hertz (Hz). In one embodiment, the node performing the process of FIG. 3 is a network node, and the network node can determine the relative frequency error (i.e., between desired and interfering cells) based on, e.g., cell type or base station power class of the corresponding base stations 12 since the frequency error depends upon the base station power class. In another embodiment, the node performing the process of FIG. 3 is the wireless device 14, and the wireless device 14 can determine the difference in frequencies between the cells, e.g., during the synchronization procedure.

Note that in describing the various example embodiments disclosed herein, the description may refer to certain conditions, considerations, or criteria as "minimum," "necessary," "mandatory," or the like, and to others as "supplemental," "optional," "additional," or the like. However, any suitable consideration or criterion, including any of the examples identified above, may be mandatory or optional in a particular implementation, and various embodiments of the present disclosure may utilize any appropriate combination of considerations or criteria.

As discussed above, in some embodiments, triggering interference mitigation at the wireless device 14 may be based, at least in part, on the signal operation type at the wireless device 14. Two examples of the signal operation type are interference estimation and channel estimation. As discussed below in detail, in one embodiment, interference mitigation is triggered conditionally for interference estimation and channel estimation. However, before describing this embodiment, a brief discussion of two examples of unconditional interference mitigation at a wireless device when performing interference estimation and channel estimation is provided. The first example is illustrated in FIG. 4A where a signal from a desired cell is received at the wireless device 14, Interference Mitigation (IM) is unconditionally performed on special REs (e.g., REs carrying CRS symbols) for both active and inactive interfering cells, and then interference and channel estimation are performed on the special REs after interference mitigation. An active interfering cell is one that is transmitting data, whereas an inactive interfering cell is on that is not transmitting data. One issue with this approach is that interference may be overestimated, particularly if one or more of the interfering cells are inactive. In the example of FIG. 4B, a signal from a desired cell is received at the wireless device 14, interference and channel estimation are performed on special REs, and then IM is performed after interference and channel estimation. One issue with this approach is that it is desirable for as much interference to be mitigated as possible before channel estimation to achieve better, or more accurate, channel estimation.

Figure 5:
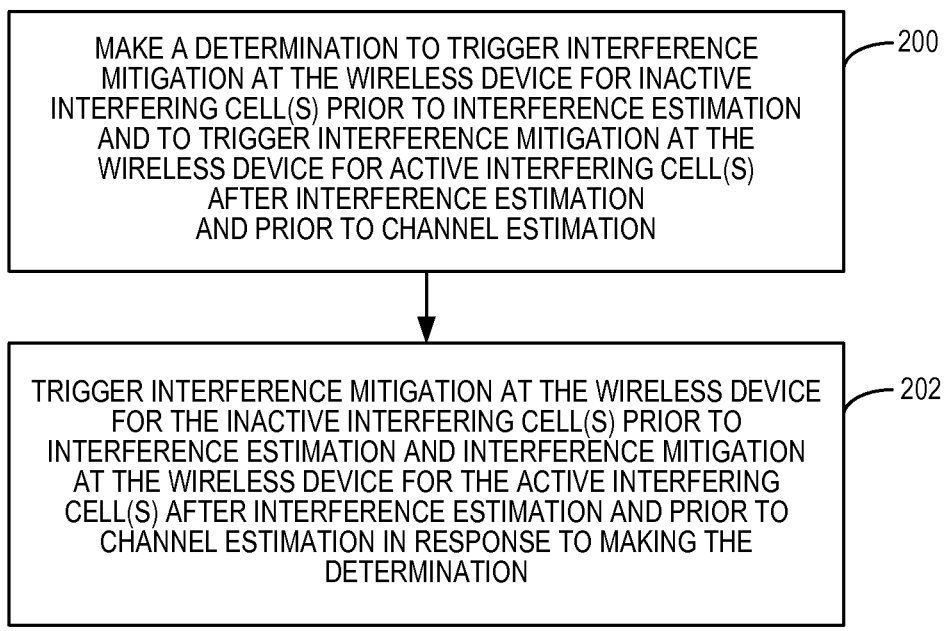
FIG. 5 illustrates a process for triggering interference mitigation at a wireless device when performing interference estimation and channel estimation according to one embodiment of the present disclosure.

FIG. 5 illustrates a process for triggering interference mitigation at the wireless device 14 when performing interference estimation and channel estimation according to one embodiment of the present disclosure. As described below with respect to FIG. 6, in this embodiment, the wireless device 14 splits interference estimation and channel estimation into separate steps. Like the process of FIG. 3, the process of FIG. 5 is performed by a node associated with the cellular communications network 10 (e.g., the base station 12-1 of the desired cell or the wireless device 14).

As illustrated, the node makes a determination to trigger interference mitigation at the wireless device 14 for one or more inactive interfering cells prior to interference estimation and to trigger interference mitigation at the wireless device 14 for one or more active interfering cells after interference estimation and prior to channel estimation (step 200). The node then triggers interference mitigation at the wireless device 14 as determined in step 200 (step 202). In this manner, interference from any inactive interfering cell(s) is (are) mitigated prior to interference estimation, which in turn improves the accuracy of the interference estimate. In addition, channel estimation is improved by mitigating both active and inactive interfering cells prior to channel estimation.

Figure 6A:
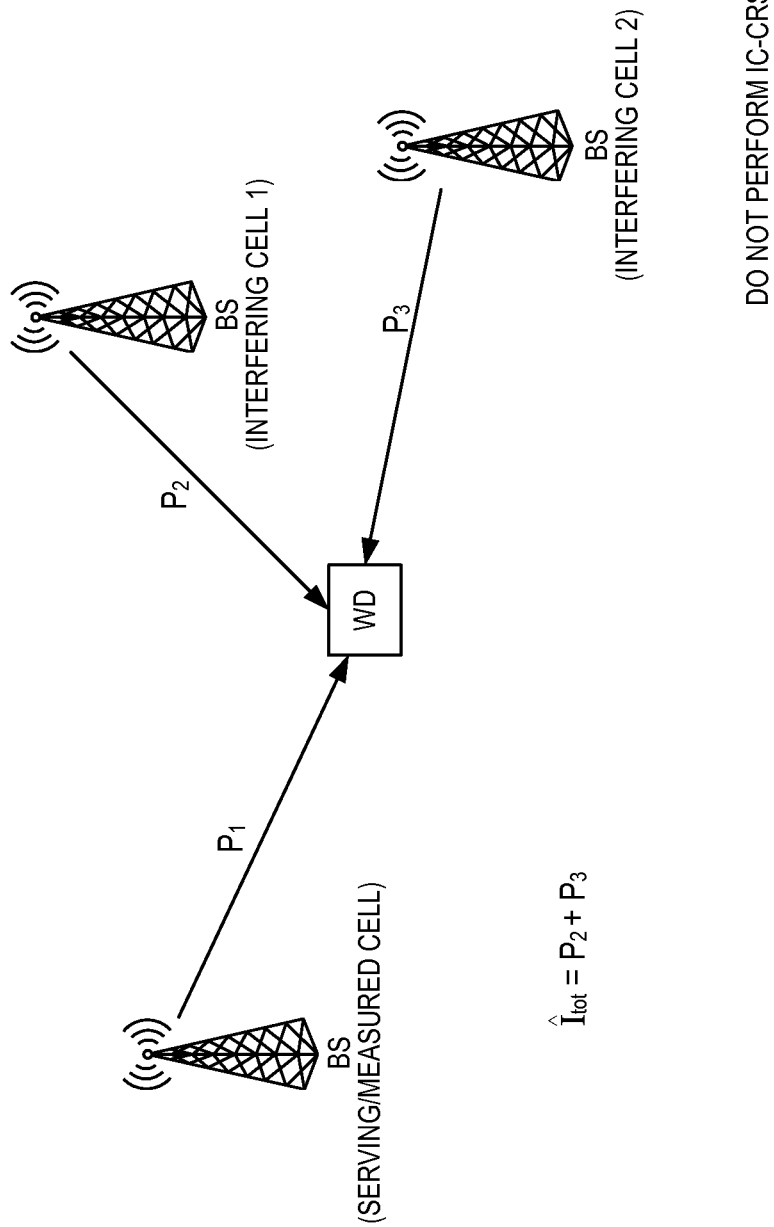
FIGS. 6A and 6B illustrate two examples of the process of FIG. 5 according to one embodiment of the present disclosure.
Figure 6B:
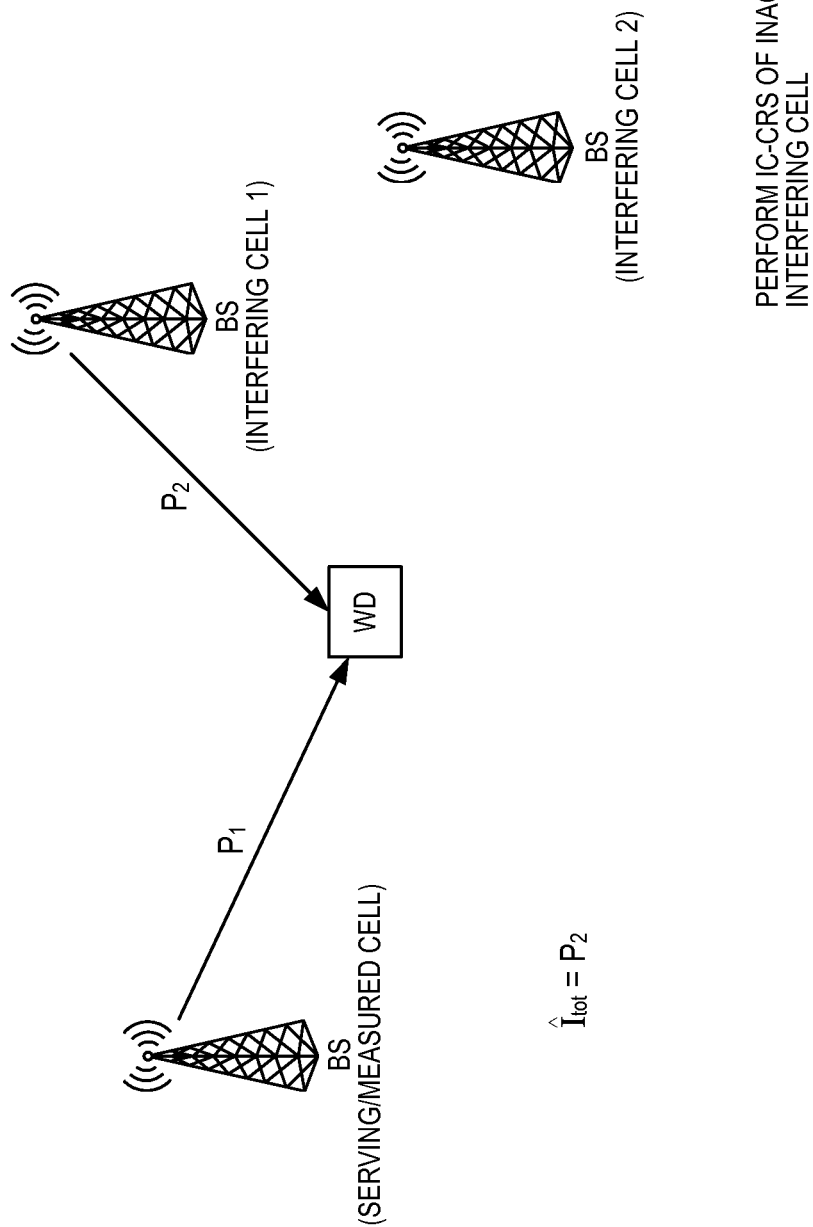

FIGS. 6A and 6B illustrate two examples of the process of FIG. 5. In the example of FIG. 6A, both of the interfering cells are active. As such, any interference cancellation before interference estimation will bias the interference estimate by underestimating the actual interference. Therefore, according to the process of FIG. 5, interference mitigation at the wireless device 14 is triggered such that: (1) no interference mitigation is performed at the wireless device 14 prior to interference estimation and (2) interference mitigation for both of the interfering cells (which are active) is performed at the wireless device 14 on special REs (e.g., REs for CRS) after interference estimation but before channel estimation. By doing so, the accuracy of the interference estimation is improved.

In contrast, in the example of FIG. 6B, the interfering cell served by the base station 12-2 (interfering cell 1) is active whereas the interfering cell served by the base station 12-3 (interfering cell 2) is inactive. In this case, where only interfering cell 1 is active, the wireless device 14 can remove interference from interfering cell 2 and then perform interference estimation. On the other hand, in case of channel estimation it is important that the estimation is done on a signal that is as interference free as possible. Thus in that case, the wireless device can remove interference from the maximum (or difference with respect to the interference estimation process) number of interfering cells. In the above example, if the wireless device 14 is capable of removing more than one interferer, then the wireless device 14 can remove interference from interfering cell 1 and perform channel estimation for the desired cell. Therefore, according to the process of FIG. 5, in this second example of FIG. 6B, interference mitigation at the wireless device 14 is triggered such that: (1) interference mitigation is performed at the wireless device 14 on special REs (e.g., REs for CRS) for interfering cell 2 prior to interference estimation and (2) interference mitigation is performed at the wireless device 14 on the special REs (e.g., REs for CRS) for interfering cell 1 (i.e., the residual interference) after interference estimation but prior to channel estimation. Since the wireless device 14 removes the contribution of the non-active interfering cell prior to interference estimation, a better match between estimated and actual interference is achieved.

Figure 7:
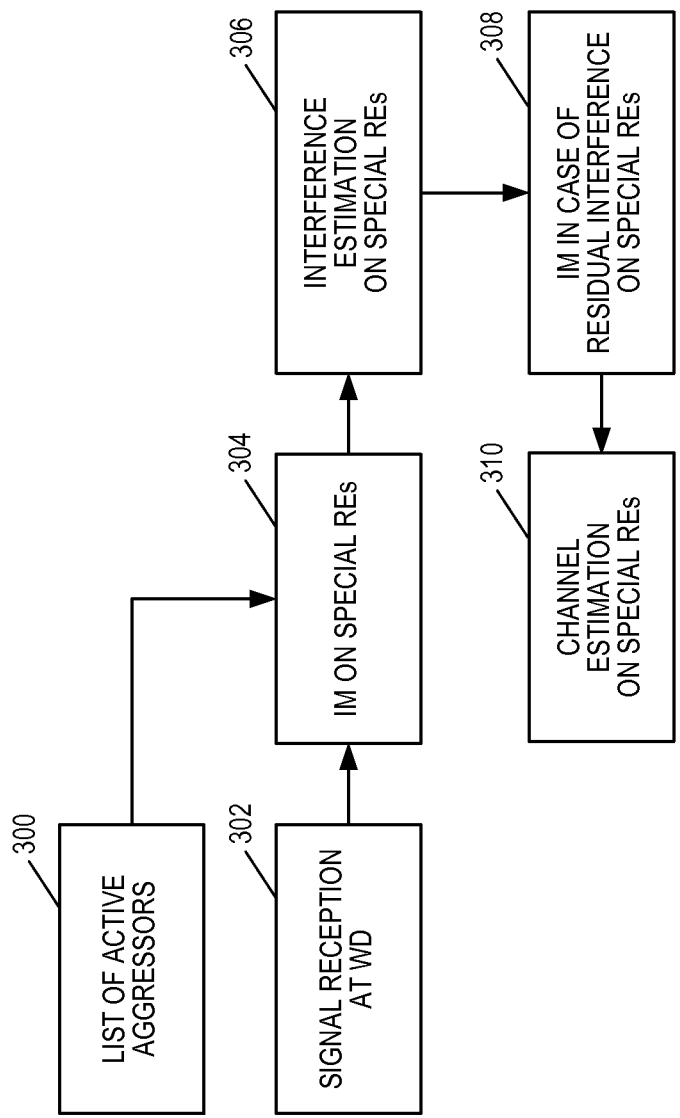
FIG. 7 is a functional block diagram that illustrates the operation of a wireless device according to one embodiment of the present disclosure.

The operation of the wireless device 14 in response to the triggering of interference mitigation according to the process of FIG. 5 illustrated in FIG. 7. In particular, FIG. 7 is a functional block diagram that illustrates the operation of the wireless device 14. As illustrated, the wireless device 14 receives, in this example, a list of active aggressors (i.e., active interfering cells) from a network node (e.g., the base station 12-1) (300). Note that while in this example the network node sends the list of active aggressors, the network node may send a list of aggressor, or interfering, cells that identifies both active and inactive interfering cells. As one example alternative, the network node may send separate lists of active and inactive interfering cells, e.g., one list for interference estimation and another list for channel estimation. In the former case, one list may be sent when the reference signals (e.g., CRS) are non-colliding between the desired and interfering cells. In the latter case, the two separate lists may be sent when the reference signals (e.g., CRS) are colliding between the desired and interfering cells. Therefore, in one embodiment, the network node selects between the two alternatives taking into account the relation of the reference signals used between cells and also the type of operation at the wireless device 14.

The wireless device 14 receives a signal from the base station 12-1 for the desired cell (302). The wireless device 14 then performs interference mitigation on special REs (e.g., REs for CRS) for any inactive aggressor, or interfering, cells as determined from the list of active aggressors (304). Then, the wireless device 14 performs interference estimation on the special REs (306). Next, the wireless device 14 performs interference mitigation on the special REs for any active aggressor, or interfering, cells as determined from the list of active aggressors (308). Lastly, the wireless device 14 performs channel estimation for the desired cell on the special REs (310).

Figure 8A:
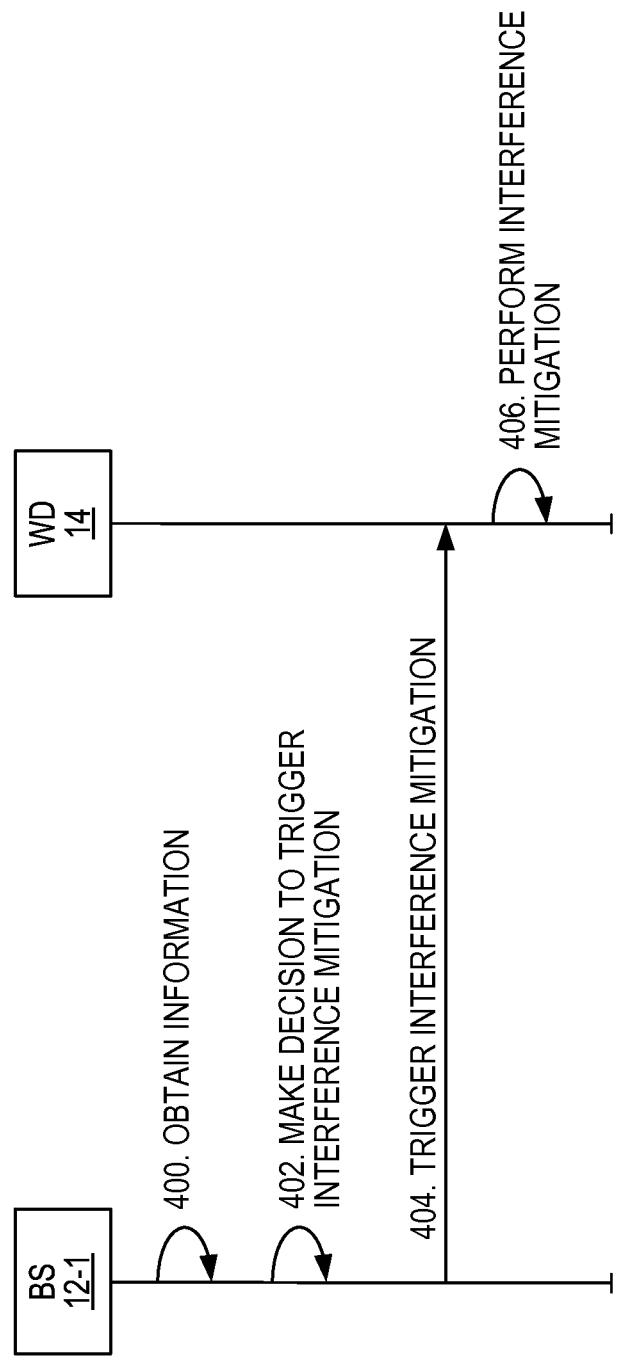
FIGS. 8A through 8C illustrate three example embodiments of the present disclosure.
Figure 8B:
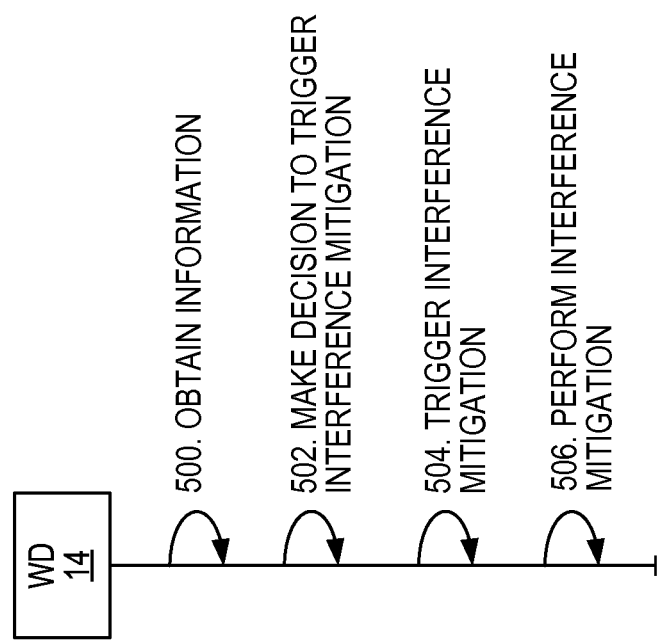
Figure 8C:
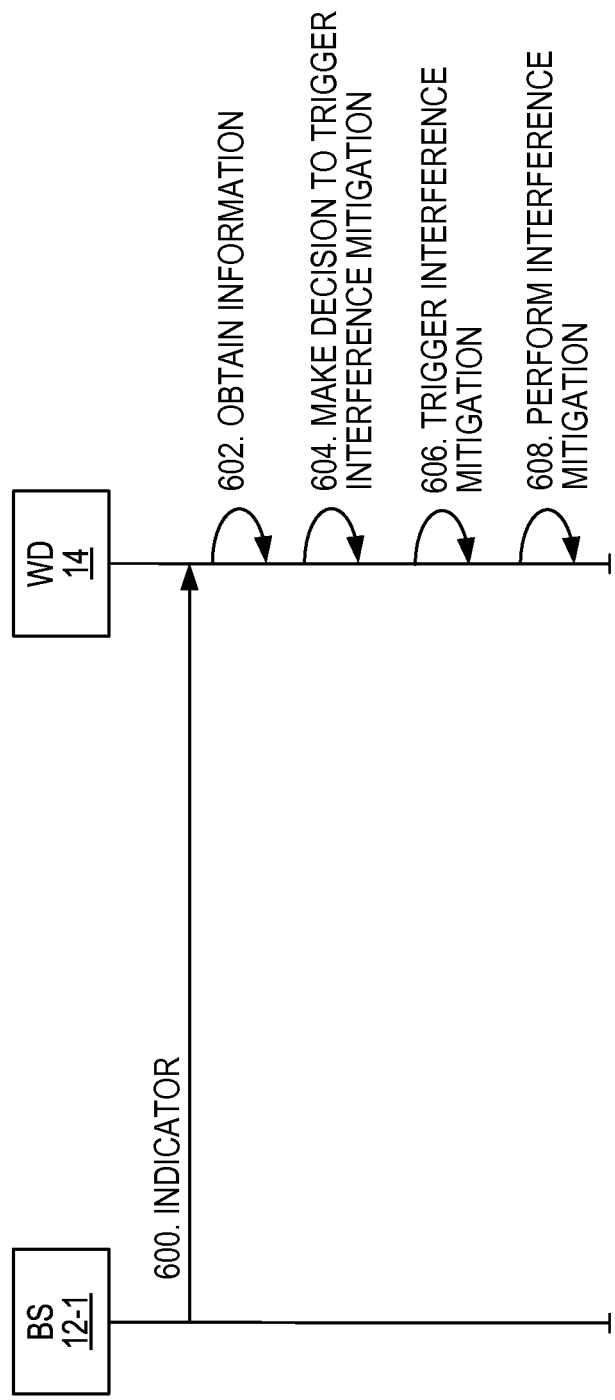

As discussed above, the processes of FIGS. 3 and 5 may be performed by a network node or the wireless device 14. In this regard, FIGS. 8A through 8C illustrate three example embodiments of the present disclosure. In FIG. 8A, the process of FIG. 3 is performed by the base station 12-1. More specifically, as illustrated, the base station 12-1 obtains the information used for determining whether to trigger interference mitigation at the wireless device 14 (step 400). The base station 12-1 makes a determination to trigger interference mitigation at the wireless device 14 based on the information using one or more predefined criteria, or conditions, as described above (step 402). The base station 12-1 then triggers interference mitigation at the wireless device 14 in response to making the determination of step 402 via explicit or implicit signaling (step 404). In response, the wireless device 14 performs interference mitigation (step 406). While the base station 12-1 performs the process of FIG. 3 in this example, in the same manner, the base station 12-1 may perform the process of FIG. 5.

FIG. 8B illustrates an embodiment in which the process of FIG. 3 is performed by the wireless device 14. More specifically, as illustrated, the wireless device 14 obtains the information used for determining whether to trigger interference mitigation at the wireless device 14 (step 500). The wireless device 14 makes a determination to trigger interference mitigation at the wireless device 14 based on the information using one or more predefined criteria, or conditions, as described above (step 502). The wireless device 14 then triggers interference mitigation at the wireless device 14 in response to making the determination of step 502 (step 504). In response, the wireless device 14 performs interference mitigation (step 506). While the wireless device 14 performs the process of FIG. 3 in this example, in the same manner, the wireless device 14 may perform the process of FIG. 5.

Thus, FIG. 8B illustrates an autonomous decision by the wireless device 14 to trigger and perform interference mitigation. The autonomous decision in the wireless device 14 can be governed by one or more predefined rules, which can be specified in a standard (e.g., a 3GPP LTE standard). Examples of such rules are as follows. In one example, it may be predefined that the wireless device 14 shall perform interference mitigation of signals (e.g., CRS-IC) interfering with reception of certain channels (e.g., PDSCH, PDCCH, PCFICH, PHICH, etc.) or when performing measurements (e.g., CSI) from the serving/measured cell provided that a set of the above mentioned conditions are met or at least when the minimum conditions are met. Such a rule will require the wireless device 14 to verify the predefined conditions and perform interference mitigation provided the conditions are met. This will require the wireless device 14 to implement a processing unit to first verify the conditions and then decide whether to perform interference mitigation of the interfering signals or not. The conditions and their levels or threshold values can also be predefined. For example, it may be predefined that the wireless device 14 shall perform interference mitigation (e.g., CRS-IC) provided the following conditions are met, e.g.:

load in at least one interfering cell is 30% or less,
signal quality (e.g., RSRQ, SINR, Signal-to-Noise Ratio (SNR), etc.) of at least one interfering cell at the wireless device 14 is above a threshold (e.g., −12 dB or above),
time offset between cells (i.e., between any pair of desired and interfering cells) is not more than 2.5 μs and/or that cells are synchronous, and
frequency error between cells (i.e., between any pair of desired and interfering cells) is not more than 200 Hz, etc.

In another example it may be predefined that the wireless device 14 shall meet certain wireless device requirements that are defined based on interference mitigation of signals (e.g., CRS-IC) which interfere with the reception of certain channels (e.g., PDCCH, PDCCH, PCFICH, PHICH, etc.) from the serving/measured (i.e., desired) cell or when performing measurements (e.g., CSI) provided a set of the above mentioned conditions are met or at least when the minimum conditions are met. The conditions and their levels or threshold values can also be predefined. This will require the wireless device 14 to implement a processing unit to first verify the predefined conditions and then decide whether to meet the wireless device requirements related to the interference cancellation or not. To meet these requirements, the wireless device 14 will have to perform the interference cancellation of the interfering signals. For example, it may be predefined that the wireless device 14 shall meet certain wireless device requirements provided, e.g.:

load in at least one interfering cell is 30% or less,
signal quality (e.g., RSRQ, SINR, SNR, etc.) of at least one interfering cell at the wireless device 14 is above a threshold (e.g., −12 dB or above),
time offset between cells (i.e., between any pair of desired and interfering cells) is not more than 2.5 μs and/or that cells are synchronous, and frequency error between cells (i.e., between any pair of desired and interfering cells) is not more than 200 Hz, etc.

Examples of wireless device requirements are PDSCH performance requirements, PDCCH performance requirements, PHICH performance requirements, PCFICH performance requirements, CSI reporting requirements (e.g., CQI, Rank Indicator (RI), Precoding Matrix Indicator (PMI) reporting requirements, etc.), etc. The data and control channel UE performance requirements are also interchangeably referred to as UE demodulation performance, throughput requirements, Block Error Ratio (BLER) performance, reception performance, etc. An example of PDSCH performance requirements are shown in Table 3 below.

TABLE 3

Minimum Performance Transmit Diversity (FRC); PDSCH performance requirements

| | | | | | | Reference Value | | |
|---|---|---|---|---|---|---|---|---|
| | | OCNG Pattern | | Propagation Conditions (Note 1) | | Correlation Matrix and Antenna | Fraction of Maximum Throughput | SNR (dB) | UE |
| Test Number | Reference Channel | Cell 1 | Cell 2 | Cell 1 | Cell 2 | Configuration | (%) | (Note 2) | Category |
| 1 | R.11-4 FDD | OP.1 FDD | OP.1 FDD | EVA5 | EVA 5 | 2x2 Medium | 70 | 5 | 2-8 |

Note 1:
The propagation conditions for Cell 1 and Cell2 are statistically independent.
Note 2:
SNR corresponds to $\hat{E}_s/N_{oc2}$ of cell 1.

FIG. 8C illustrates one example of a hybrid embodiment in which a network node (which in this example is the base station 12-1) and the wireless device 14 operate together to conditionally trigger interference mitigation at the wireless device 14. As illustrated, the base station 12-1 sends an indicator to the wireless device 14 to trigger, or enable, interference mitigation (step 600). The indicator may be sent, or signaled, in any desired manner (e.g., explicit or implicit signaling). Further, in one example, the base station 12-1 performs the process of FIG. 3 or FIG. 5 to determine whether to send the indicator. Before and/or after receiving the indicator, the wireless device 14 obtains the information used for determining whether to trigger interference mitigation at the wireless device 14 (step 602). The wireless device 14 makes a determination to trigger interference mitigation at the wireless device 14 based on the indicator and the information using one or more predefined criteria, or conditions, as described above (step 604). The wireless device 14 then triggers interference mitigation at the wireless device 14 in response to making the determination of step 604 (step 606). In response, the wireless device 14 performs interference mitigation (step 608). While the wireless device 14 performs the process of FIG. 3 in response to the indicator, in the same manner, the wireless device 14 may perform the process of FIG. 5 in response to the indicator.

Notably, the process of FIG. 8C can be enforced by defining predefined rules in a corresponding cellular network standard (e.g., a 3GPP LTE standard). For example, it may be predefined that the wireless device 14 shall meet the UE performance requirements that are based on interference mitigation (e.g., CRS-IC) provided that the following conditions are met:

The wireless device 14 receives at least an explicit indication to activate interference from the network node;
The wireless device 14 receives information about at least one interfering cell from the network node; and
The wireless device 14 meets certain predefined conditions.

Figure 9:
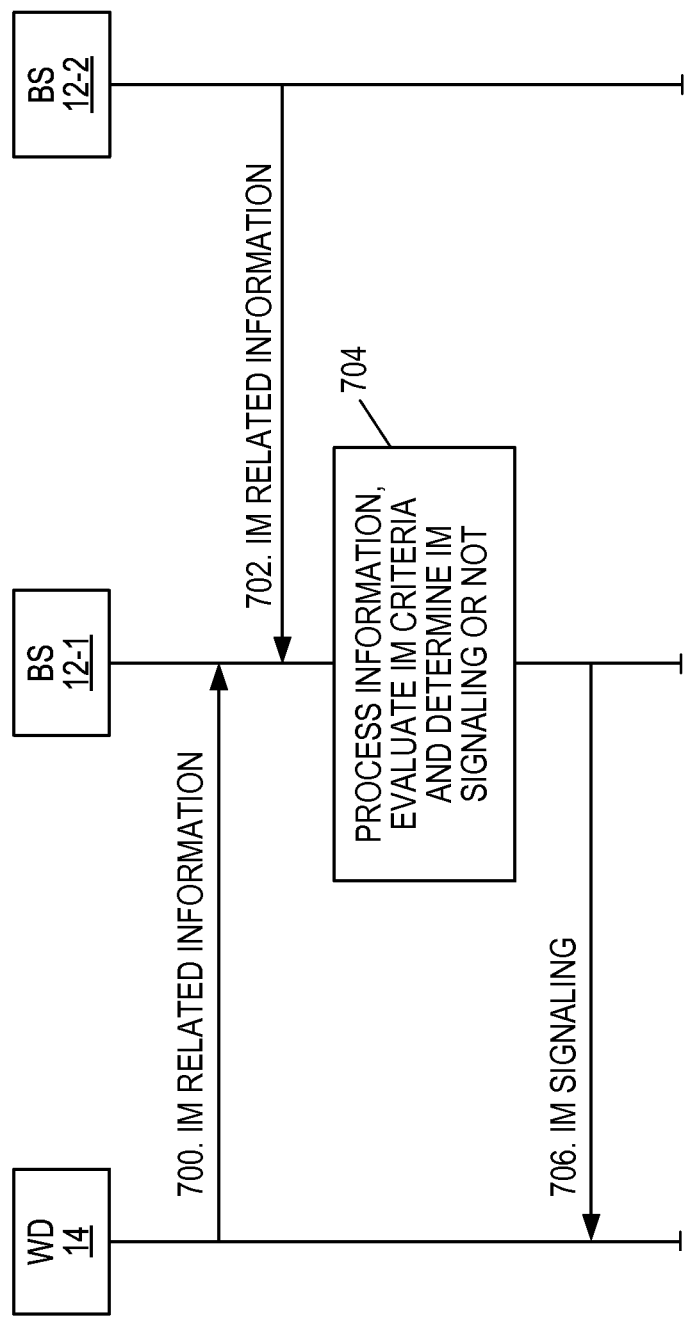
FIG. 9 illustrates an embodiment that is similar to that of FIG. 8A but where obtaining of at least some of the information used for deciding whether to trigger interference mitigation at the wireless device is explicitly shown as being obtained from the wireless device and the base station of one of the interfering cells according to one embodiment of the present disclosure.

FIG. 9 illustrates an embodiment that is similar to that of FIG. 8A but where obtaining of at least some of the information used for deciding whether to trigger interference mitigation at the wireless device 14 is explicitly shown as being obtained from the wireless device 14 and the base station 12-2 of one of the interfering cells according to one embodiment of the present disclosure. As illustrated, the base station 12-1 receives IM related information from the wireless device 14 and the base station 12-2 (steps 700 and 702). In the same manner, the base station 12-1 may receive IM related information from the base station 12-3 of the other interfering cell. The IM related information is any of the information described above (e.g., information indicative of the interference mitigation capability of the wireless device 14, information indicative of a signal load or interference level in the interfering cell(s), information indicative of a signal relation between the desired cell and the interfering cell(s), etc.). The base station 12-1 then processes the information, evaluates the predefined criteria or conditions for triggering interference mitigation at the wireless device 14, and determines whether to send IM signaling to the wireless device 14 to trigger interference mitigation at the wireless device 14 based on the evaluation of the predefined criteria or conditions (step 704). In this example, interference mitigation at the wireless device 14 is to be triggered and, as such, the base station 12-1 sends corresponding IM signaling to the wireless device 14 to thereby trigger interference mitigation at the wireless device 14 (step 706).

Figure 10:
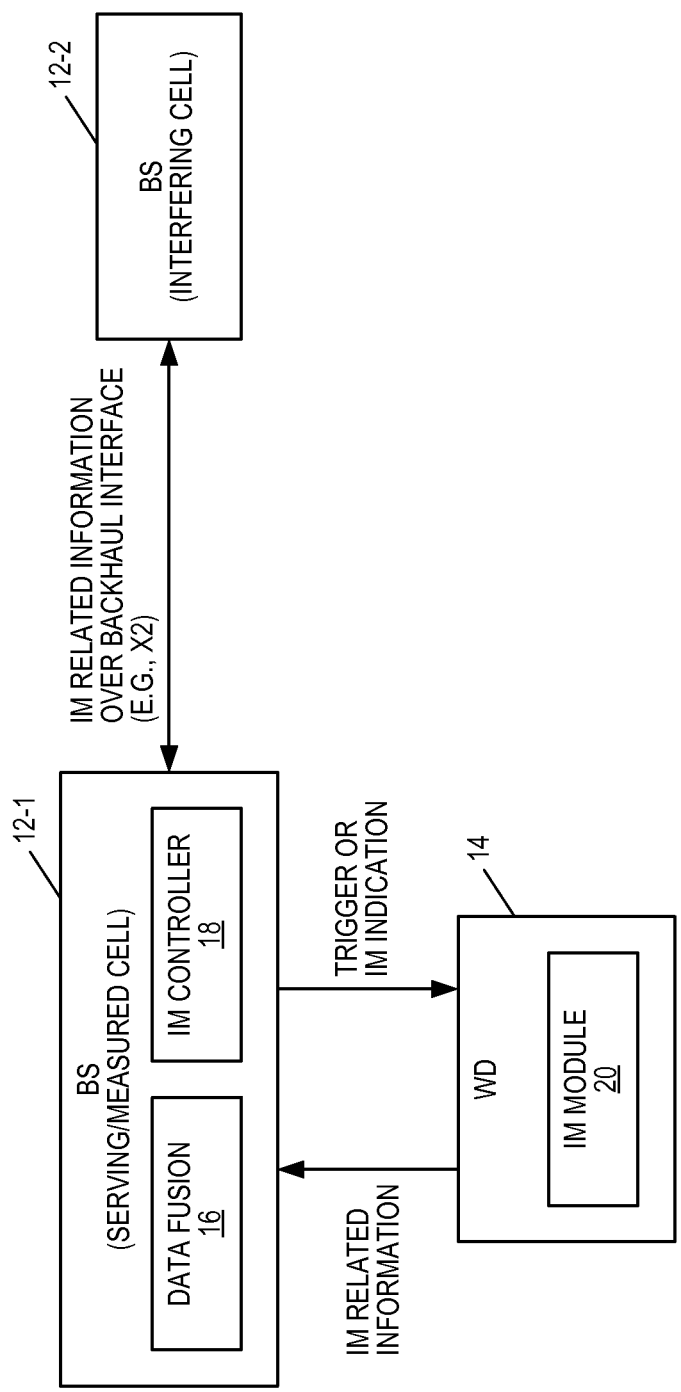
FIG. 10 is a block diagram that illustrates functional components of the base station of the desired cell, the base station of one of the interfering cells, and the wireless device according to one embodiment of the present disclosure.

FIG. 10 is a block diagram that illustrates functional components of the base station 12-1, the base station 12-2, and the wireless device 14 according to one embodiment of the present disclosure. Each of the function components, or modules, may be implemented in hardware, software, or a combination thereof. In this example, the base station 12-1 includes a data fusion module 16 that operates to collect the information used for deciding whether to trigger interference mitigation at the wireless device 14 and an IM controller 18 that operates to evaluate the one or more predefined criteria or conditions to determine whether to trigger interference mitigation at the wireless device 14. The data fusion module 16 may collect the information from, e.g., the base station 12-2 via a backhaul interface between the base stations 12-1 and 12-2 (e.g., an X2 interface) and/or the wireless device 14. The wireless device 14 includes an IM module 20 that operates to perform interference mitigation, as triggered by the IM controller 18 of the base station 12-1. Note that FIG. 10 is just one example. For instance, the data fusion module 16 and the IM controller 18 may alternatively be implemented at some other network node or at the wireless device 14.

While the present disclosure is not limited thereto, certain implementations of the embodiments disclosed herein may provide numerous benefits including such advantages as: performing load aware interference estimation, reducing mismatch between actual and estimated interference, improving demodulation and CSI (e.g., CQI) estimation performance, ensuring that UE power consumption is not unnecessarily increased, ensuring that UE processing remains within certain limits while on average performance is improved, and ensuring that the UE achieves enhanced performance also in a homogeneous network when operating in a CRE region.

Figure 11:
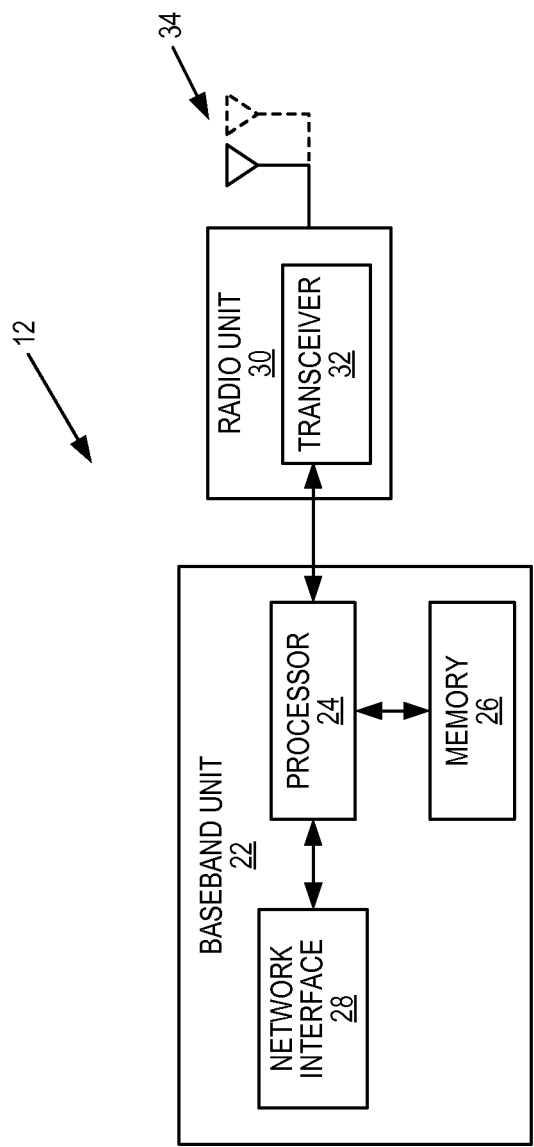
FIG. 11 is a block diagram of an example embodiment of a base station.

FIG. 11 illustrates one example of one of the base stations 12 according to one embodiment of the present disclosure.

This description also applies to other type radio network nodes. Still further, apart from the radio unit 30 and antenna(s) 34, this discussion also applies to network nodes other than radio network nodes. As illustrated, the base station 12 includes baseband unit 22 including a processor 24, a memory 26, and a network interface 28 and a radio unit 30 including a transceiver 32 coupled to one or more antennas 34. In particular embodiments, some or all of the functionality described above as being provided by the base station 12 (or similarly a network node) may be provided by the processor 24 executing instructions or software stored on a computer-readable medium, such as the memory 26. For example, either or both of the data fusion module 16 and the IM controller 18 of FIG. 10 may be implemented by the processor 24 executing corresponding instructions or software stored on a computer-readable medium, such as the memory 26. Alternative embodiments of the base station 12 may include additional components responsible for providing additional functionality, including any of the functionality identified above and/or any functionality necessary to support the embodiments described above.

Figure 12:
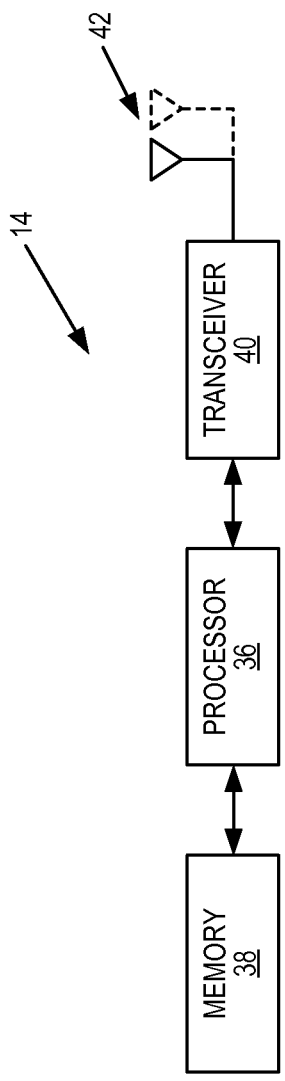
FIG. 12 is a block diagram of an example embodiment of a wireless device.

FIG. 12 illustrates one example of the wireless device 14 according to one embodiment of the present disclosure. As illustrated, the wireless device 14 includes a processor 36, memory 38, and a transceiver 40 coupled to one or more antennas 42. In particular embodiments, some or all of the functionality described above as being provided by the wireless device 14 may be provided by the processor 36 executing instructions or software stored on a computer-readable medium, such as the memory 38. For example, the IM module 20 of FIG. 10 may be provided by the processor 36 executing corresponding instructions or software stored on a computer-readable medium, such as the memory 38. Alternative embodiments of the wireless device 14 may include additional components beyond those shown in FIG. 12 that may be responsible for providing certain aspects of the wireless device's 14 functionality, including any of the functionality described above and/or any functionality necessary to support the embodiments described above.

The following acronyms are used throughout this disclosure.

3GPP 3$^{rd}$ Generation Partnership Project
μs Microsecond
ABS Almost Blank Subframe
A-GNSS Assisted Global Navigation Satellite System
A-GPS Assisted Global Positioning System
AoA Angle of Arrival
AP Access Point
BLER Block Error Ratio
BS Base Station
BTS Base Transceiver Station
CA Carrier Aggregation
CC Component Carrier
CDMA Code Division Multiple Access
CoMP Coordinated Multi-Point
CP Cyclic Prefix
CPICH Common Pilot Channel
CQI Channel Quality Indication/Index
CRE Cell Range Expansion
CRS Cell-Specific Reference Signal
CSI Channel State Information
CSI-RS Channel State Information—Reference Symbol
DAS Distributed Antenna System
dB Decibel
dBm Decibel-Milliwatt
DB-DC-HSDPA Dual-Band-Dual-Carrier-High Speed Downlink Packet Access
DMRS Demodulation Reference Signal
E-CID Enhanced Cell Identity
eICIC Enhanced Inter-Cell Interference Coordination
eNB Enhanced Node B
E-SMLC Evolved Serving Mobile Location Centre
FDD Frequency Division Duplexing
FeICIC Further Enhanced Inter-Cell Interference Coordination
FFT Fast Fourier Transform
HPN High Power Node
HSPA High Speed Packet Access
Hz Hertz
IC Interference Cancellation
ICIC Inter-Cell Interference Coordination
ID Identity
IE Information Element
IFFT Inverse Fast Fourier Transform
IM Interference Mitigation
IMR Interference Measurement Resource
LEE Laptop Embedded Equipment
LME Laptop Mounted Equipment
LMU Location Management Unit
LPN Low Power Node
LPP Long Term Evolution Positioning Protocol
LPPa Long Term Evolution Positioning Protocol A
LTE Long Term Evolution
LTE Rel-8 Long Term Evolution Rel-8
LTE Rel-10 Long Term Evolution Rel-10
LTE Rel-11 Long Term Evolution Rel-11
MBSFN Multicast-Broadcast Single-Frequency Network
MCS Modulation and Coding Scheme
MDT Minimization of Drive Test
MME Mobility Management Entity
ms Millisecond
MSC Mobile Switching Centre
MSR Multi-Standard Radio
NC Neighbor Cell
O&M Operations and Management
OFDM Orthogonal Frequency Division Multiplexing
OSS Operational Support System
OTDOA Observed Time Difference of Arrival
PBCH Physical Broadcast Channel
PCC Primary Component Carrier
PCell Primary Cell
PCFICH Physical Control Format Indicator
PCI Physical Cell Identity
PDA Personal Digital Assistant
PDCCH Physical Downlink Control Channel
PDSCH Physical Downlink Shared Channel
PHICH Physical Hybrid Automatic Repeat Request Indicator Channel
PL Path Loss
PMI Precoding Matrix Indicator
PRB Physical Resource Block
PRS Positioning Reference Signal
PSC Primary Serving Cell
PSS Primary Synchronization Signal
RAT Radio Access Technology
RB Resource Block
RE Resource Element
RFID Radio Frequency Identification
RI Rank Indicator
RIP Received Interference Power
RRC Radio Resource Control
RRH Remote Radio Head
RRM Radio Resource Management
RRU Remote Radio Unit RSRQ Reference Signal Received Quality
RSRP Reference Signal Received Power
RSTD Reference Signal Time Difference
Rx Receive
SCC Secondary Component Carrier
SCell Secondary Cell
SCH Synchronization Channel
SINR Signal-to-Interference plus Noise Ratio
SNR Signal-to-Noise Ratio
SON Self Organizing Network
SSC Secondary Serving Cell
SSS Secondary Synchronization Signal
TDD Time Division Duplexing
TS Technical Specification
USB Universal Serial Bus
Tx Transmit
UE User Equipment
UTDOA Uplink Time Difference of Arrival
WCDMA Wideband Code Division Multiple Access Those skilled in the art will recognize improvements and modifications to the preferred embodiments of the present disclosure. All such improvements and modifications are considered within the scope of the concepts disclosed herein and the claims that follow.

What is claimed is:

1. A method of operation of a node associated with a cellular communications network, comprising:
   making a determination to trigger interference mitigation at a wireless device based on:
     a signal load or interference level in at least one interfering cell from which transmissions result in interference at the wireless device during reception from a desired cell,
     a relation between reference signals used in the desired cell and the at least one interfering cell, and
     a timing relation between at least one of the group consisting of:
       signals transmitted by the desired cell and the at least one interfering cell, and
       signals received at the wireless device from the desired cell and the at least one interfering cell; and
   triggering interference mitigation at the wireless device in response to making the determination to trigger interference mitigation at the wireless device.

2. The method of claim 1 wherein the desired cell is a serving cell of the wireless device.

3. The method of claim 1 wherein the desired cell is a measured cell of the wireless device.

4. The method of claim 1 wherein:
   the node is the wireless device such that making the determination to trigger interference mitigation at the wireless device and triggering the interference mitigation are each performed by the wireless device.

5. The method of claim 4 further comprising:
   receiving an indication from a network node of the cellular communications network that the wireless device is to perform interference mitigation;
   wherein making the determination to trigger interference mitigation at the wireless device comprises making the determination in response to receiving the indication.

6. The method of claim 1 wherein:
   the node is a network node of the cellular communications network such that making the determination to trigger interference mitigation at the wireless device and triggering the interference mitigation are each performed by the network node.

7. The method of claim 6 wherein the network node is a radio access node.

8. The method of claim 7 wherein the radio access node is a base station of a serving cell of the wireless device.

9. The method of claim 6 wherein triggering the interference mitigation at the wireless device comprises providing an implicit indication to the wireless device to perform interference mitigation.

10. The method of claim 9 wherein:
    the network node is a base station of a serving cell of the wireless device; and
    providing the implicit indication to the wireless device comprises sending information regarding the at least one interfering cell to the wireless device.

11. The method of claim 6 wherein triggering the interference mitigation at the wireless device comprises providing an explicit indication to the wireless device to perform interference mitigation.

12. The method of claim 11 wherein the explicit indication comprises information that informs the wireless device of signals on which the wireless device is to perform interference mitigation.

13. The method of claim 11 wherein the signals comprise one or more of: a Cell-specific Reference Signal (CRS), a Secondary Synchronization Signal (SSS), a Primary Synchronization Signal (PSS), a Physical Broadcast Channel (PBCH), a Physical Downlink Shared Channel (PDSCH), a Physical Downlink Control Channel (PDCCH), a Physical Control Format Indicator Channel (PCFICH), and a Physical Hybrid-Automatic Repeat Request Indicator Channel (PHICH).

14. The method of claim 11 wherein the explicit indication further comprises one or more of the following:
    a Boolean indicator indicating whether or not the wireless device is to perform interference mitigation;
    information informing the wireless device of one or more physical channels for which the wireless device is to perform interference mitigation;
    information informing the wireless device of one or more types of signal operations for which the wireless device is to perform interference mitigation; and
    information informing the wireless device of one or more physical resources for which the wireless device is to perform interference mitigation.

15. The method of claim 1 wherein making the determination to trigger interference mitigation at the wireless device comprises making the determination to trigger interference mitigation at the wireless device if the signal load or interference level in the at least one interfering cell meets a predefined condition.

16. The method of claim 1 wherein making the determination to trigger interference mitigation comprises making the determination to trigger interference mitigation when predefined criteria are satisfied, wherein:
    the predefined criteria are based on the signal load in the at least one interfering cell, the relation between the reference signals used in the desired cell and the at least one interfering cell, and the timing relation; and
    the predefined criteria comprise:
      a first criterion that the relation between the reference signals used in the desired cell and the at least one interfering cell be non-colliding, wherein the non-colliding reference signals do not overlap in time and frequency; and
      a second criterion that the signal load in the at least one interfering cell be less than a predetermined threshold.

17. The method of claim 16 wherein the interference mitigation is Cell-Specific Reference Signal (CRS) interference mitigation, and the relation between the reference signals is a relation between CRSs used in the desired cell and the at least one interfering cell.

18. The method of claim 1 wherein the relation between the reference signals used in the desired cell and the at least one interfering cell comprises a colliding or non-colliding relation between the reference signals used in the desired cell and the at least one interfering cell, wherein a colliding relation exists between the reference signals if the reference signals fully or partly overlap in time or frequency.

19. The method of claim 18 wherein the reference signals are Cell-Specific Reference Signals (CRSs) used in the desired cell and the at least one interfering cell.

20. The method of claim 18 wherein making the determination to trigger interference mitigation comprises making the determination to trigger interference mitigation when predefined criteria are satisfied, wherein:
the predefined criteria are based on the signal load in the at least one interfering cell, the relation between the reference signals used in the desired cell and the at least one interfering cell, and the timing relation; and
the predefined criteria comprise a first criterion based on the colliding or non-colliding relation between the reference signals used in the desired cell and the at least one interfering cell.

21. The method of claim 1 wherein:
triggering the interference mitigation at the wireless device comprises triggering the interference mitigation such that the interference mitigation is performed by the wireless device prior to channel estimation; and
making the determination to trigger interference mitigation comprises making the determination to trigger interference mitigation when predefined criteria are satisfied, wherein:
the predefined criteria are based on the signal load in the at least one interfering cell, the relation between the reference signals used in the desired cell and the at least one interfering cell, and the timing relation; and
the predefined criteria comprise a first criterion that the relation between the reference signals used in the desired cell and the at least one interfering cell be colliding wherein the colliding reference signals partly or fully overlap in time and frequency.

22. The method of claim 1 wherein making the determination to trigger interference mitigation comprises making the determination to trigger interference mitigation when predefined criteria are satisfied, wherein:
the predefined criteria are based on the signal load in the at least one interfering cell, the relation between the reference signals used in the desired cell and the at least one interfering cell, and the timing relation; and
the predefined criteria comprise a first criterion that the timing relation be such that the wireless device can perform the interference mitigation using a single receiver.

23. The method of claim 1 wherein making the determination to trigger interference mitigation comprises making the determination to trigger interference mitigation when predefined criteria are satisfied, wherein:
the predefined criteria are based on the signal load in the at least one interfering cell, the relation between the reference signals used in the desired cell and the at least one interfering cell, and the timing relation; and
the predefined criteria comprise a first criterion that the timing relation be less than a predetermined threshold.

24. The method of claim 1 wherein making the determination to trigger interference mitigation is further based on one or more supplemental criteria.

25. The method of claim 24 wherein the one or more supplemental criteria comprises a criterion based on a signal operation type of the wireless device.

26. The method of claim 25 wherein the signal operation type is one of a group consisting of: channel estimation, interference estimation, demodulation assessment, and Channel State Information (CSI) assessment.

27. The method of claim 25 wherein the signal operation type of the wireless device is interference estimation followed by channel estimation, and the at least one interfering cell comprises two or more interfering cells, and:
making the determination to trigger interference mitigation further comprises making a determination to trigger interference mitigation at the wireless device for at least one of the two or more interfering cells that is inactive prior to interference estimation and to trigger interference mitigation at the wireless device for at least one other of the two or more interfering cells that is active after interference estimation and prior to channel estimation; and
triggering interference mitigation comprises triggering interference mitigation at the wireless device for the at least one of the two or more interfering cells that is inactive prior to interference estimation and interference mitigation at the wireless device for the at least one other of the two or more interfering cells that is active after interference estimation and prior to channel estimation in response to making the determination.

28. The method of claim 24 wherein the one or more supplemental criteria comprise a criterion that interference mitigation is to be triggered depending upon a battery life of the wireless device.

29. The method of claim 24 wherein the one or more supplemental criteria comprise a criterion that interference mitigation is to be triggered if the desired cell and the at least one interfering cell correspond to a defined network deployment scenario.

30. The method of claim 24 wherein the one or more supplemental criteria comprise a criterion that interference mitigation is to be triggered if a location of the wireless device with respect to the at least one interfering cell satisfies one or more predefined conditions.

31. The method of claim 24 wherein the one or more supplemental criteria comprise a criterion that interference mitigation is to be triggered if a frequency error between the desired cell and the at least one interfering cell is less than a threshold.

32. A node associated with a cellular communications network, comprising:
a processor configured to:
make a determination to trigger interference mitigation at a wireless device based on:
a signal load in at least one interfering cell from which transmissions result in interference at the wireless device during reception from a desired cell,
a relation between reference signals used in the desired cell and the at least one interfering cell, and
a timing relation between at least one of the group consisting of:
signals transmitted by the desired cell and the at least one interfering cell, and
signals received at the wireless device from the desired cell and the at least one interfering cell; and trigger interference mitigation at the wireless device in response to making the determination to trigger interference mitigation at the wireless device.

33. The node of claim 32 wherein the node is the wireless device.

34. The node of claim 32 wherein the node is a network node of the cellular communications network.

35. The node of claim 34 wherein the network node is a radio access node.

36. The node of claim 35 wherein the radio access node is a base station of a serving cell of the wireless device.

\* \* \* \* \*